US012706529B2

(12) United States Patent
Huber et al.

(10) Patent No.: US 12,706,529 B2
(45) Date of Patent: Aug. 11, 2026

(54) FLYING-CAPACITOR MULTI-LEVEL BRIDGELESS TOTEM-POLE BOOST PFC CONVERTERS WITH REDUCED ZERO-CROSSING DISTORTION OF LINE CURRENT

(71) Applicant: Delta Electronics, Inc., Taipei (TW)

(72) Inventors: Laszlo Huber, Durham, NC (US); Peter Mantovanelli Barbosa, Durham, NC (US)

(73) Assignee: Delta Electronics, Inc., Taipei (TW)

(*) Notice: Subject to any disclaimer, the term of this patent is extended or adjusted under 35 U.S.C. 154(b) by 278 days.

(21) Appl. No.: 18/379,857

(22) Filed: Oct. 13, 2023

(65) Prior Publication Data

US 2025/0125719 A1 Apr. 17, 2025

(51) Int. Cl.
*H02M 1/42* (2007.01)
*H02M 1/00* (2006.01)
(Continued)

(52) U.S. Cl.
CPC ....... *H02M 1/4233* (2013.01); *H02M 1/0025* (2021.05); *H02M 1/082* (2013.01); *H02M 1/44* (2013.01)

(58) Field of Classification Search
CPC .... H02M 1/4233; H02M 1/0025; H02M 1/44; H02M 1/047
See application file for complete search history.

(56) References Cited

U.S. PATENT DOCUMENTS 10,381,915 B1 * 8/2019 Dusmez ................ H02M 7/217
10,910,943 B1 * 2/2021 Lin ..................... H02M 1/4225
(Continued)

FOREIGN PATENT DOCUMENTS

CN 109617387 A 4/2019
CN 110365205 B 7/2020
(Continued)

OTHER PUBLICATIONS

Chung et al., "A Digital Controlled of Duty-ratio Feedforward for Four-level Flying Capacitor Boost PFC", May 2023, 11th International Conference on Power Electronics—ECCE Asia, pp. 607-614 (Year: 2023).*
(Continued)

*Primary Examiner* — Lakaisha Jackson
(74) *Attorney, Agent, or Firm* — KIRTON McCONKIE; Evan R. Witt

(57) ABSTRACT

In one embodiment, a multi-level, bridgeless boost power factor correction (PFC) device, comprising: a circuit comprising an inductor, and at least a first pair and a second pair of switches and a capacitor arranged in a flying capacitor, totem-pole configuration; and a control circuit configured to drive the at least first and second pairs of switches in such a way as to reduce distortion in a line current, wherein for the first and second pairs of switches, the control circuit is configured to: for a first half line cycle, drive a first switch of each pair during an entire interval of the first half-line cycle and a second switch of each pair for less than the entire interval; and for a second half-line cycle, drive the first switch of each pair for less than an entire interval of the second half-line cycle and the second switch of each pair during an entire interval of the second half-line cycle.

16 Claims, 27 Drawing Sheets

(51) Int. Cl.

| | |
|---|---|
| ***H02M 1/08*** | (2006.01) |
| ***H02M 1/44*** | (2007.01) |

(56) References Cited

U.S. PATENT DOCUMENTS

| | | | | |
|---|---|---|---|---|
| 2014/0355319 | A1 | 12/2014 | Cohen | |
| 2015/0249403 | A1 | 9/2015 | Sato et al. | |
| 2017/0237339 | A1 | 8/2017 | Young et al. | |
| 2021/0006149 | A1* | 1/2021 | Zong | H02M 1/126 |
| 2021/0126526 | A1* | 4/2021 | Lin | H02M 7/217 |

FOREIGN PATENT DOCUMENTS

| | | | |
|---|---|---|---|
| CN | 110112903 | B | 3/2021 |
| CN | 112910281 | A | 6/2021 |
| CN | 114189141 | A | 3/2022 |
| CN | 114826011 | A | 7/2022 |
| JP | 6231673 | B2 | 11/2017 |
| TW | 202228371 | A | 7/2022 |

OTHER PUBLICATIONS

Sun, "Control challenges in a totem-pole PFC", 2017, Analog Applications Journal, pp. 1-4 (Year: 2017).*

Yu-Chen Chung et al., "A Digital Controlled of Duty-ratio Feedforward for Four-level Flying Capacitor Boost PFC," 2023 11th International Conference on Power Electronics and ECCE Asia (ICPE 2023—ECCE Asia), Jeju Island, Korea, Republic of, 2023, pp. 607-614.

Bosheng Sun, Control challenges in a totem-pole PFC, Analog Applications Journal, 2017.

* cited by examiner

FLYING-CAPACITOR MULTI-LEVEL BRIDGELESS TOTEM-POLE BOOST PFC CONVERTERS WITH REDUCED ZERO-CROSSING DISTORTION OF LINE CURRENT

FIELD OF THE INVENTION

This invention relates to power factor correction (PFC) converters, and more particularly to multi-level bridgeless totem-pole boost PFC converters with flying capacitors.

BACKGROUND OF THE INVENTION

Today's data centers have increased demand for energy consumption due to increased levels of data usage. Therefore, efficiency and power density of power supplies in today's data centers are becoming increasingly more important.

The conventional topology of power supplies in today's data centers is a two-stage topology with a non-isolated boost PFC front end and an isolated LLC DC/DC converter. A boost PFC front end 10 implemented as a two-level bridgeless totem-pole continuous conduction mode (CCM) PFC with Gallium Nitride (GaN) switches, shown in FIG. 1, can already meet the high-efficiency requirement with efficiencies above 99%. However, operation in CCM is usually achieved with hard switching of the totem-pole switches (e.g., Sa and Sb in FIG. 1). To keep the switching losses low, the switching frequency is kept relatively low, typically 65 kilohertz (kHz), which is too low to fully reap the benefits of using GaN devices in totem-pole PFC circuits. As a result, the volume of the PFC choke and the electromagnetic interference (EMI) filter is relatively large.

To achieve both high efficiency and high power density of the PFC front end, recently, a flying-capacitor multi-level (FCML) converter was proposed for the PFC front end (see, e.g., T. T. Vu and G. Young, "Implementation of multi-level bridgeless PFC rectifiers for mid-power single phase applications," *Proc. IEEE Applied Power Electronics Conf.* (APEC), 2016, pp. 1835-1841). In FIG. 2, a three-level FCML bridgeless totem-pole boost PFC 20 is presented as an example, where switches $S_{1a}$, $S_{2a}$, $S_{1b}$, $S_{2b}$ are the totem-pole switches, $C_{FL}$ is the flying capacitor, and switches $S_p$, $S_n$ are the half-line cycle selection switches (also called unfolder switches). Typical waveforms 30 of the gate drive voltages ($V_{GS1a}$, $V_{GS2a}$, $V_{GS1b}$, $V_{GS2b}$), totem-pole midpoint voltage ($v_M$), boost-inductor current ($i_{LB}$), and flying capacitor voltage ($v_{CFL}$) during a positive half-line cycle, when the instantaneous line voltage is greater than half of the output voltage, are presented in FIG. 3 for a three-level FCML bridgeless totem-pole boost PFC (e.g., as shown in FIG. 2). FIG. 3 also includes the waveforms of the triangular carrier signals ($V_{CAR1,2}$) and the control voltage ($v_{CTRL}$) that determine the gate drive voltages. It can be seen in FIG. 3 that the inner switches $S_{1a,b}$ and the outer switches $S_{2a,b}$ are each controlled in complementary manner, and that the gate drive voltages of inner and outer switches are phase shifted by 180°. It can also be seen in FIG. 3, that the ripple frequency of the boost-inductor current is twice the switching frequency. Therefore, the size of the boost inductor and EMI filter can be reduced. It is also shown in FIG. 3 that the average voltage across the flying capacitor is half of the output voltage and the voltage swing across the totem-pole switches is equal to half of the output voltage. Therefore, lower voltage rated switches can be used, which have lower parasitic capacitances than their higher voltage counterparts, resulting in decreased switching losses. Eventually, the efficiency of the FCML bridgeless totem-pole CCM boost PFC can even exceed the efficiency of a corresponding 2-level boost PFC.

For a general case, a multi-level (e.g., an n-level) FCML bridgeless totem-pole boost PFC 40 is presented in FIG. 4, where, $S_{1a}$-$S_{(n-1)a}$ and $S_{1b}$-$S_{(n-1)b}$ are the totem-pole switches, $C_{FL1}$-$C_{FL(n-2)}$ are the flying capacitors, and switches $S_p$, $S_n$ are the half-line cycle selection switches. The ripple frequency of the boost inductor current is (n−1) times the switching frequency. The average voltage across the flying capacitors is $V_{CFL1}=V_O/(n-1), \ldots, V_{CFL(n-2)}=(n-2)V_O/(n-1)$. Therefore, the voltage swing across the totem-pole switches is equal to 1/(n−1) of the output voltage. Reference herein to the term, multi-level, refers to an n-level, where n is an integer number greater than or equal to 3. A multi-level FCML bridgeless totem-pole boost PFC comprises at least two upper switches (e.g., above the totem pole input node, such as the node after $L_B$ and between $S_{1a}$ and $S_{1b}$ in FIG. 4) and two lower switches, or generally speaking, at least two pairs of totem-pole switches. For instance, for a three-level configuration (e.g., n=3), there are at least two pairs of totem-pole switches (e.g., first pair $S_{1a}$, $S_{1b}$, and second pair $S_{2a}$, $S_{2b}$). As explained above, a multi-level configuration has certain advantages over non-multi-level (e.g., 2-level) configurations (e.g., higher ripple frequency, lower-rated voltage switches, etc.).

Various techniques have been developed to provide for control of boost PFC devices. In general, a feedback control loop is used to regulate the boost PFC device and achieve a control objective, wherein the output of a boost PFC circuit is sensed, compared to a reference, and the resulting error is passed to a control circuit, which generates a duty cycle command for a pulse-width modulator (which in turn produces switch control signals). For the totem-pole arrangement, the driving signals for each pair of switches are complementary. For instance, and referring to FIG. 2 for illustration, during the positive half-line cycle, $S_{1a}$ serves the role of a boost switch controlled based on a duty cycle command, D, from the control loop, and Sib serves the role of a fast synchronous rectifier (SR) that is controlled by the 1-D. In the negative half cycle, the roles (and corresponding duty cycle commands) are reversed. Though improvements have been achieved in improving the power factor and reducing zero-crossing distortion, zero-crossing distortions may still be present under certain conditions in multi-level boost PFC devices. Thus, improvements in the control of these types of devices are desired.

SUMMARY OF THE INVENTION

In one embodiment, a multi-level, bridgeless boost power factor correction (PFC) device, comprising: a circuit comprising an inductor, and at least a first pair and a second pair of switches and a capacitor arranged in a flying capacitor, totem-pole configuration; and a control circuit configured to drive the at least first and second pairs of switches in such a way as to reduce distortion in a line current, wherein for the first and second pairs of switches, the control circuit is configured to: for a first half line cycle, drive a first switch of each pair during an entire interval of the first half-line cycle and a second switch of each pair for less than the entire interval; and for a second half-line cycle, drive the first switch of each pair for less than an entire interval of the second half-line cycle and the second switch of each pair during an entire interval of the second half-line cycle.

These and other aspects of the invention will be apparent from and explained with reference to the embodiment(s) described hereinafter.

BRIEF DESCRIPTION OF THE DRAWINGS

Many aspects of the invention can be better understood with reference to the following drawings, which are diagrammatic. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF EMBODIMENTS

Figure 1:
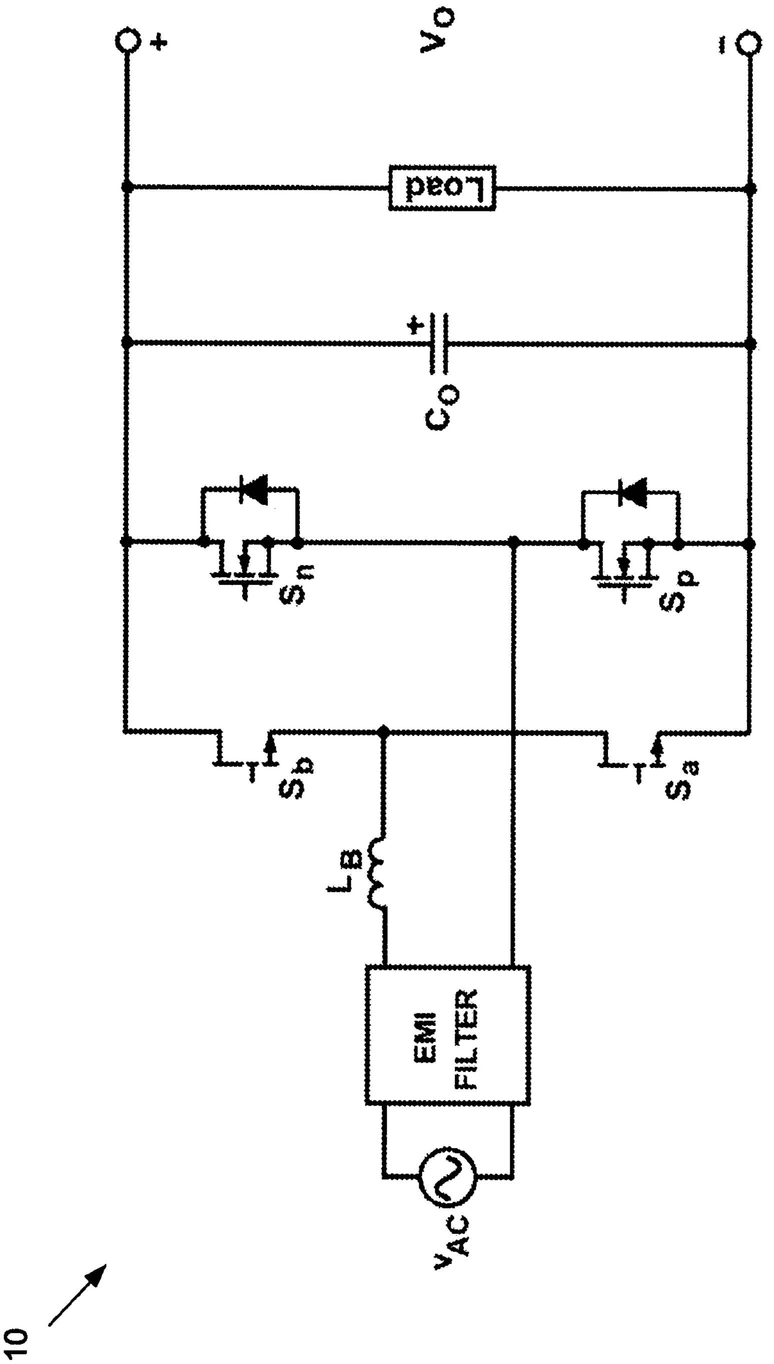
FIG. 1 shows a circuit diagram of an example 2-level bridgeless totem-pole boost PFC converter.
Figure 2:
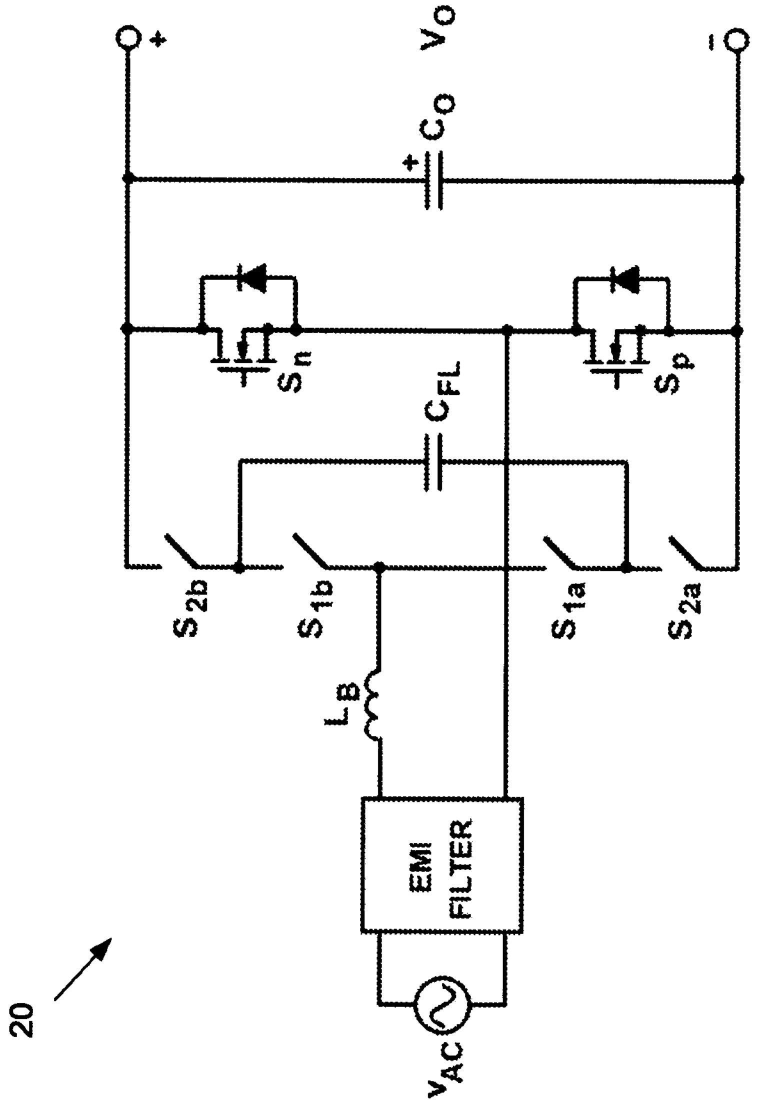
FIG. 2 shows a circuit diagram of an example 3-level FCML bridgeless totem-pole boost PFC converter.

Certain embodiments of a flying capacitor, multi-level (FCML) bridgeless totem-pole boost PFC converter device are disclosed. For instance, the FCML bridgeless totem-pole boost PFC converter device reduces the line current distortions around the zero-crossings of the line voltage. In one embodiment, a control circuit of the device reduces the line current distortion by disabling the conduction of the totem-pole synchronous rectifiers around the zero-crossings of the line voltage. In some embodiments, a control circuit of the device reduces the line current distortion by disabling the conduction of the unfolder synchronous rectifiers as well as the totem-pole boost switches and synchronous rectifiers around the zero-crossings of the line voltage. In some embodiments, a control circuit of the device reduces the line current distortion, especially at light loads, by employing a feedforward duty cycle control with mixed mode conduction (e.g., by a mixed continuous conduction mode (CCM) and discontinuous conduction mode (DCM)).

Having summarized certain feature of a FCML bridgeless totem-pole boost PFC converter device of the present disclosure, reference will now be made in detail to the description of a FCML bridgeless totem-pole boost PFC converter device as illustrated in the drawings. While a FCML bridgeless totem-pole boost PFC converter device will be described in connection with these drawings, with emphasis on a three-level configuration, there is no intent to limit it to the embodiment or embodiments disclosed herein. For instance, the embodiments described herein may likewise be applied to multi-level, or n-level, configurations where n is greater than three. Further, although the description identifies or describes specifics of one or more embodiments, such specifics are not necessarily part of every embodiment, nor are all of any various stated advantages necessarily associated with a single embodiment. On the contrary, the intent is to cover alternatives, modifications and equivalents included within the principles and scope of the disclosure as defined by the appended claims. For instance, two or more embodiments may be interchanged or combined in any combination. Further, it should be appreciated in the context of the present disclosure that the claims are not necessarily limited to the particular embodiments set out in the description.

Figure 3:
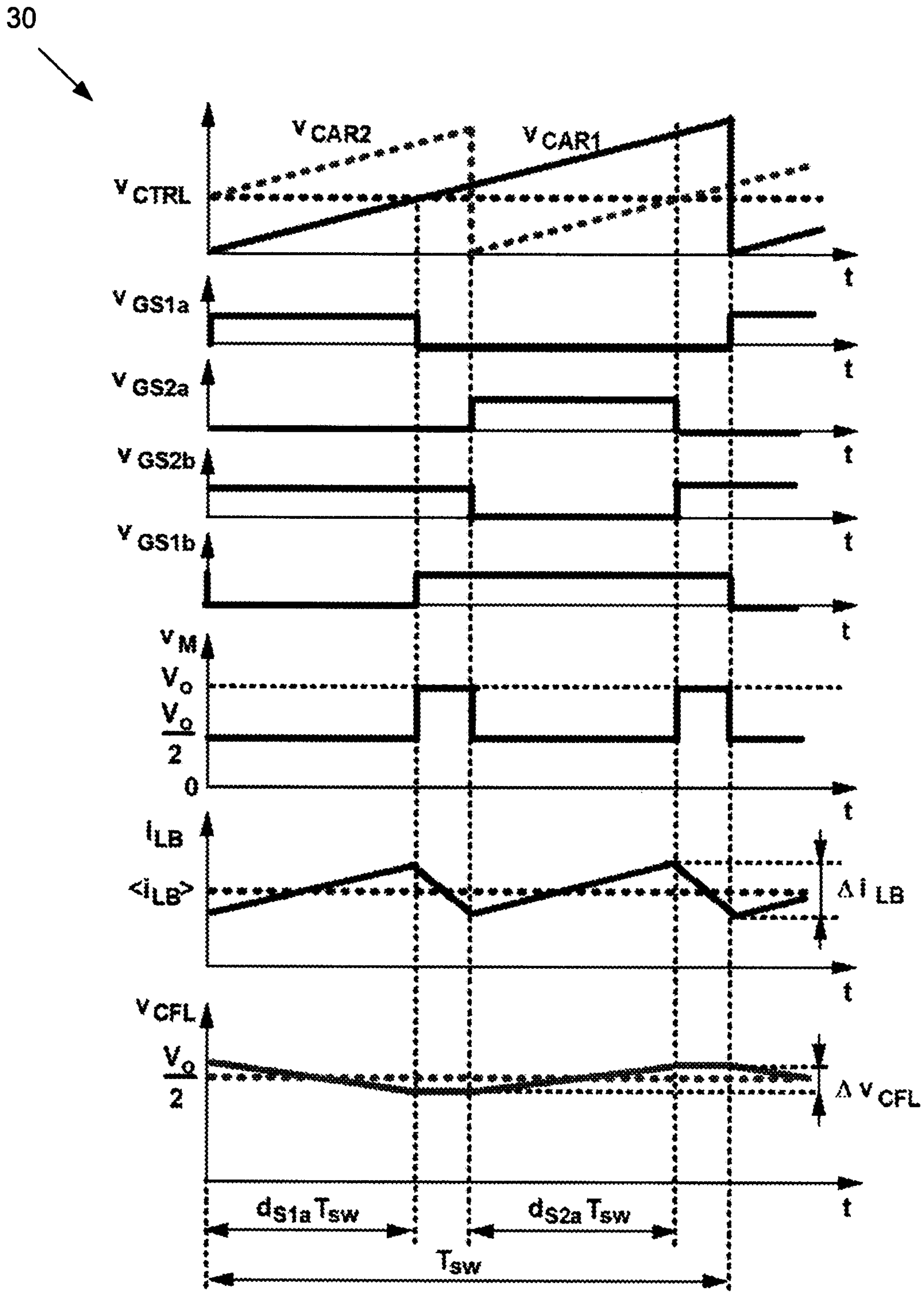
FIG. 3 shows important voltage and current waveforms of the 3-level FCML bridgeless totem-pole boost PFC converter in FIG. 2.
Figure 5:
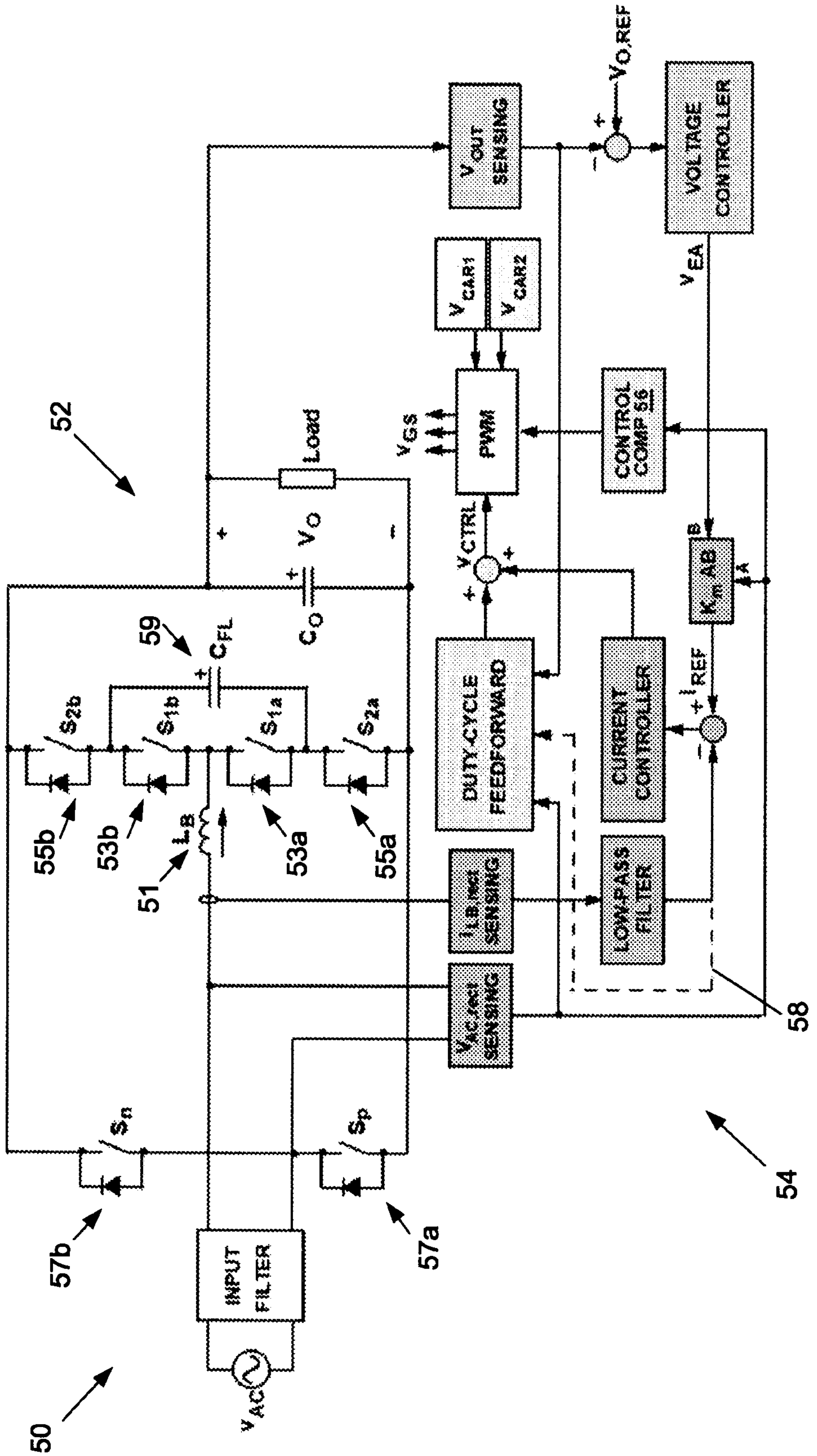
FIG. 5 shows a block diagram of an embodiment of an example control circuit with average current control of a 3-level FCML bridgeless totem-pole boost PFC converter.

FIG. 5 is a block diagram that illustrates an embodiment of an example multi-level (e.g., 3-level) FCML bridgeless totem pole boost PFC device 50 (hereinafter, referred to also as simply device 50) comprising a 3-level FCML bridgeless totem pole boost PFC circuit 52 (hereinafter, also simply circuit 52) and a control circuit 54. The circuit 52 in the depicted embodiment, as similarly described for the 3-level circuit of FIG. 3, includes an inductor 51, a first pair of switches 53 (e.g., inner switches $S_{1a}$ 53*a*, $S_{1b}$ 53*b*), a second pair of switches (e.g., outer switches $S_{2a}$ 55*a*, $S_{2b}$ 55*b*), and a flying capacitor 59 arranged between the first pair of switches 53 and second pair of switches 55. The first pair of switches 53 and the second pair of switches 55 are arranged in a totem-pole configuration, and when coupled to the flying capacitor 59, are collectively arranged in what may be referred to as a flying capacitor, totem-pole configuration. The circuit 52 further comprises half-line cycle selection switches 57 (e.g., $S_p$ 57*a* and $S_n$ 57*b*). The device 50 operates in part according to average current-mode control and duty-cycle feedforward control. In general, for average current-mode control, a current controller is used in a feedback control loop and the line current leads the line voltage. However, with the line current leading the voltage, non-unity power factor and zero-crossing distortion of the line current may result. The duty-cycle feedforward control attempts to address these shortcomings by further using an out-of-loop (outside the feedback control loop) determined duty-cycle value (e.g., based on a rectified line voltage and the output voltage of the boost PFC), otherwise referred to as a pre-calculated duty-cycle value. In effect, the duty-cycle feedforward control alleviates the feedback control loop of performing this task. The pre-calculated duty cycle value is combined with the current control loop value to control switches of the circuit 52. For instance, the pre-calculated duty-cycle from the duty-cycle feedforward control is added to the current-mode control output of the current controller to generate the PWM waveforms to control the switches of the circuit 52. Note that, unlike a 2-level boost PFC circuit, which uses a single carrier, the 3-level FCML bridgeless totem pole boost PFC circuit 52 uses two carriers ($V_{car1}$ and $V_{car2}$). In general, for multi-level topologies, multiple (phase-shifted) carriers, or n−1 carriers, are used. In this example, n equals three (i.e., three-level), and thus 2 (i.e., 3-1) carriers are used. In one embodiment, inputs to the control circuit 54 include $V_{AC}$, rectified, $I_{LB}$, rectified, and Vout.

For operation under CCM, the duty-cycle feedforward control pre-calculates the CCM duty cycle of the boost switch according to Equation (1) below:

$$D_{FF,CCM} = 1 - \frac{|v_{IN}|}{V_O}, \tag{1}$$

where, $|v_{IN}|$ is the rectified line voltage and Vo is the output voltage of the PFC converter. In some embodiments, the duty-cycle feedforward control may include additional input 58, as represented by the dashed line connecting the low-pass filter with the duty-cycle feedforward control, as explained further below. As shown in FIG. 5 and explained above, the pre-calculated duty cycle is added to the output of the current controller. Therefore, in steady state operation, the duty cycle of the boost switch is mostly determined by the pre-calculated duty cycle $D_{FF,CCM}$ and the contribution of the current controller to the duty cycle of the boost switch is significantly reduced. As a result, the phase shift between the line voltage and line current with duty-cycle feedforward control is significantly smaller than the phase shift without duty-cycle feedforward control. Consequently, the power factor is improved and the zero-crossing distortion of the line current is reduced. Further information about duty-cycle feedforward control for CCM operation may be found in a publication by D. M. V. D. Sype, K. D. Gusseme, A. P. V. D. Bossche, and J. A. Melkebeek, entitled "Duty-ratio feedforward for digitally controlled boost PFC converters," *Proc. IEEE Applied Power Electronics Conf.* (*APEC*), 2003, pp. 396-402.

The control circuit 54 further comprises a control component 56, and in some embodiments, additional functionality to the duty-cycle feedforward block. Note that the control circuit 54 in FIG. 5 (and similarly, in FIGS. 10 and 12) comprise an illustrative, functional block diagram, and that separately-illustrated components may be combined in practice, or a single component may comprise multiple, separate components. Before describing the control component 56, some challenges posed by limitations in the duty-cycle that hamper performance for existing bridgeless totem-pole boost PFCs are first addressed to provide some context. It follows from Equation (1) above that, at zero-crossings of the line voltage ($v_{IN}$=0), the duty cycle of the boost switch is equal to 1. However, due to practical duty-cycle limitations (e.g., the duty cycle is practically less than 100% due to delays in the circuit, voltage drops, etc.), existing bridgeless totem-pole boost PFCs exhibit line current spikes at zero-crossings of the line voltage. In fact, as the boost inductor current can flow in both directions due to the synchronous-rectifier (SR) switches in the totem-pole leg, a current runaway occurs around the zero-crossing of the line voltage.

The reduction of the zero-crossing distortion of the line current at different load levels, according to the present invention, is described using as an example the circuit 52 of FIG. 5. It should be appreciated that any transistor type suggested by the drawings that are described below are not intended to limit the circuit topology. For instance, transistors may include MOSFETs (e.g., SiC MOSFETS), GaN, among others, and are contemplated to be within the scope of the disclosed embodiments of the invention. Also, though certain embodiments of the invention are described in the context of the 3-level FCML bridgeless totem-pole boost PFC converter device 50 of FIG. 5 (and the variations shown in FIGS. 10 and 12), it should be appreciated by one having ordinary skill in the art, in the context of the present disclosure, that the description for such embodiments may be easily extended to other multi-level FCML bridgeless totem-pole boost PFC converter devices (e.g., levels greater than three) as explained above, and are hence contemplated to be within the scope of the disclosure.

Figure 6A:
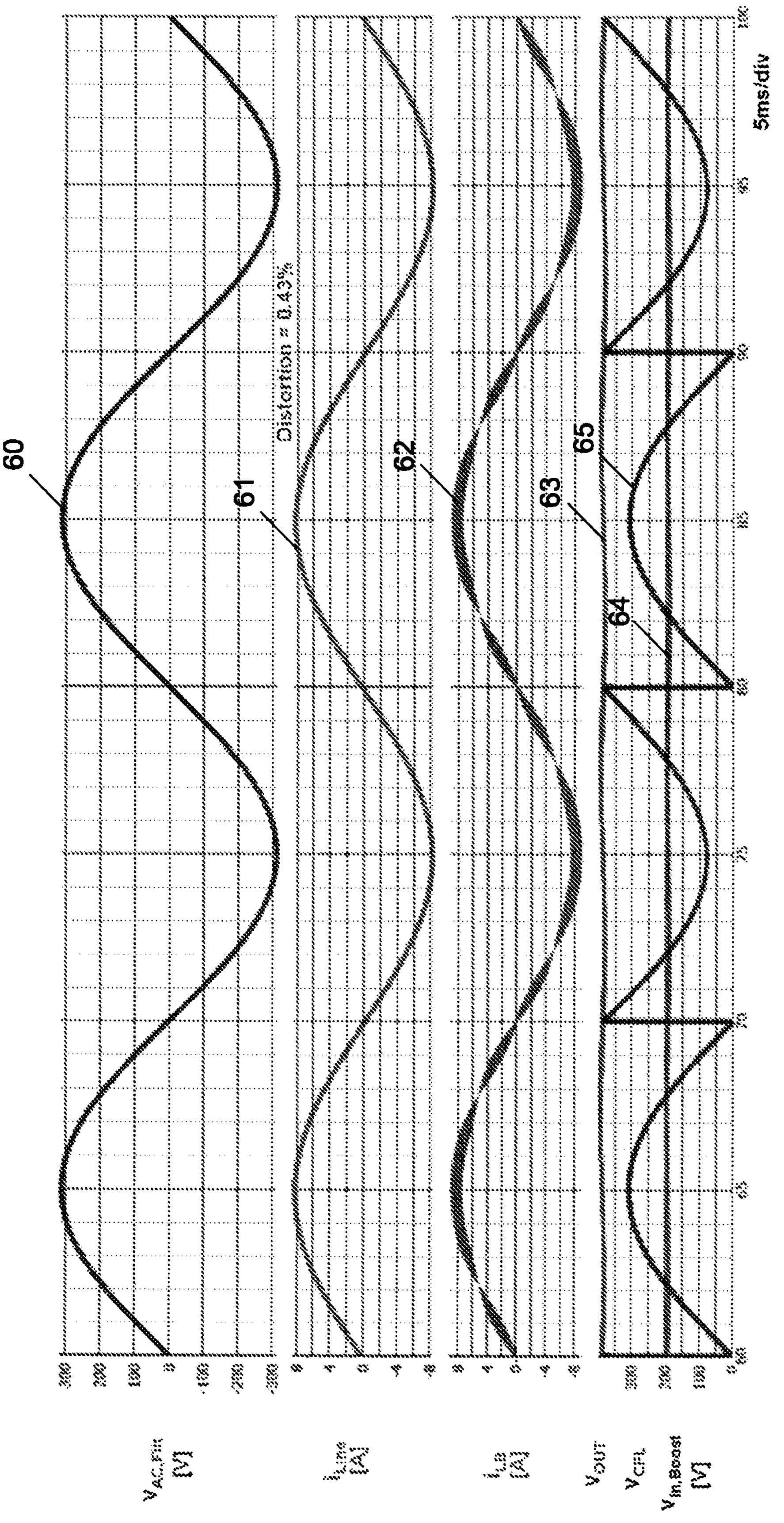
FIG. 6A shows important waveforms obtained on an example 3-level FCML bridgeless totem-pole boost PFC converter at 50% load when operating without duty cycle limitation.
Figure 6B:
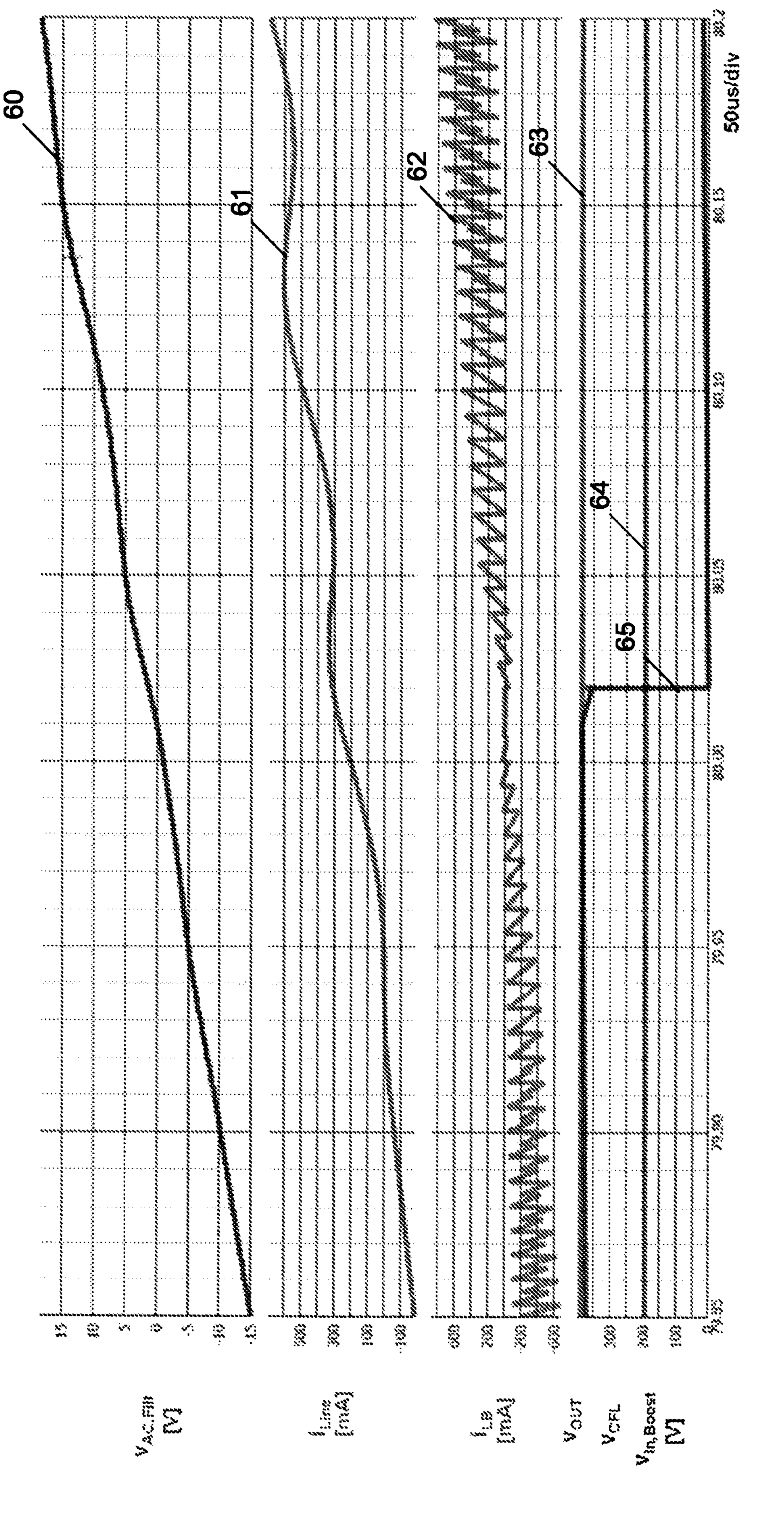
FIG. 6B shows the important waveforms of FIG. 6A zoomed in around a zero-crossing of the line voltage.
Figure 7A:
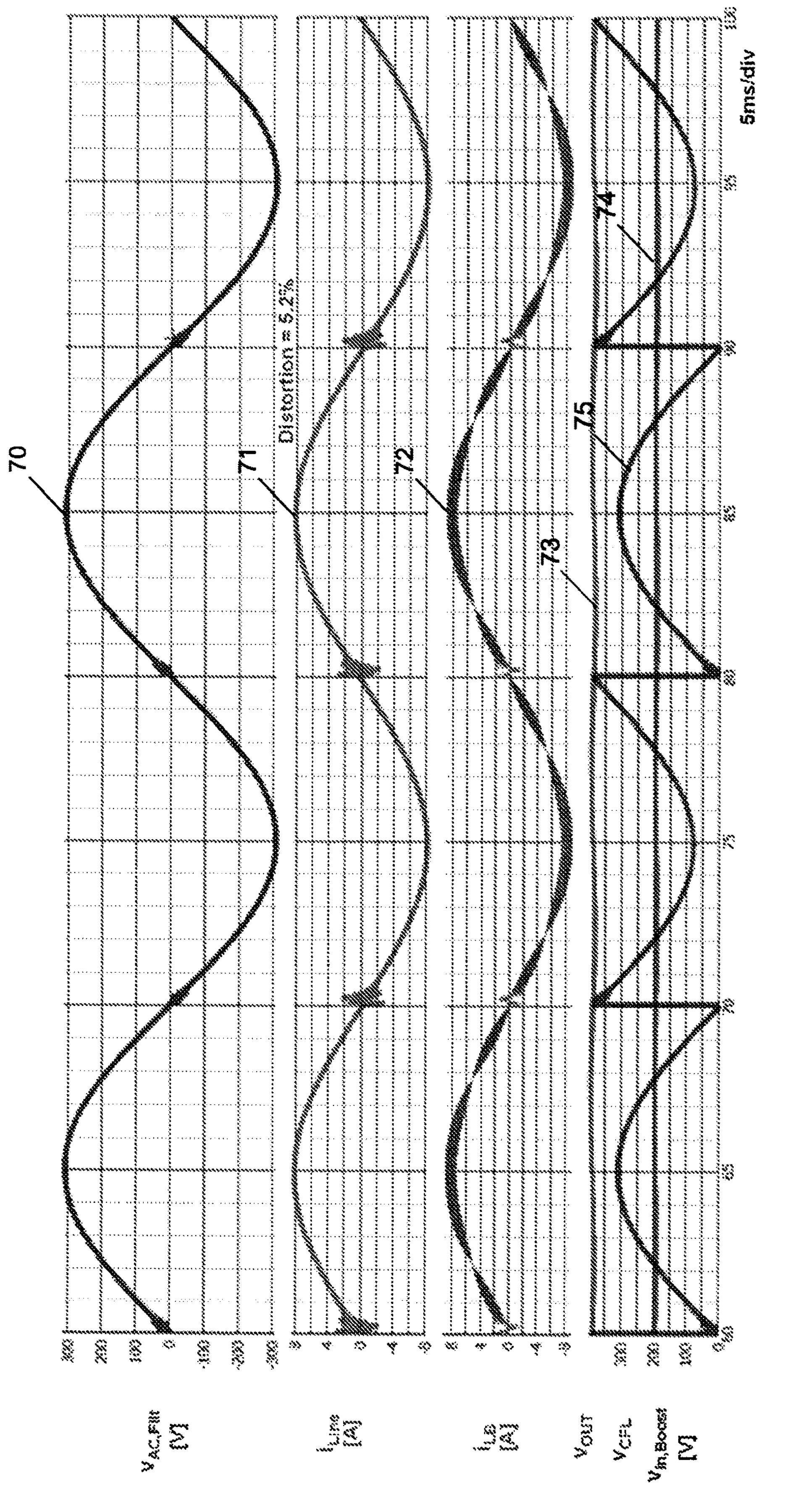
FIG. 7A shows important waveforms obtained on an example 3-level FCML bridgeless totem-pole boost PFC converter at 50% load when operating with duty cycle limitation.
Figure 7B:
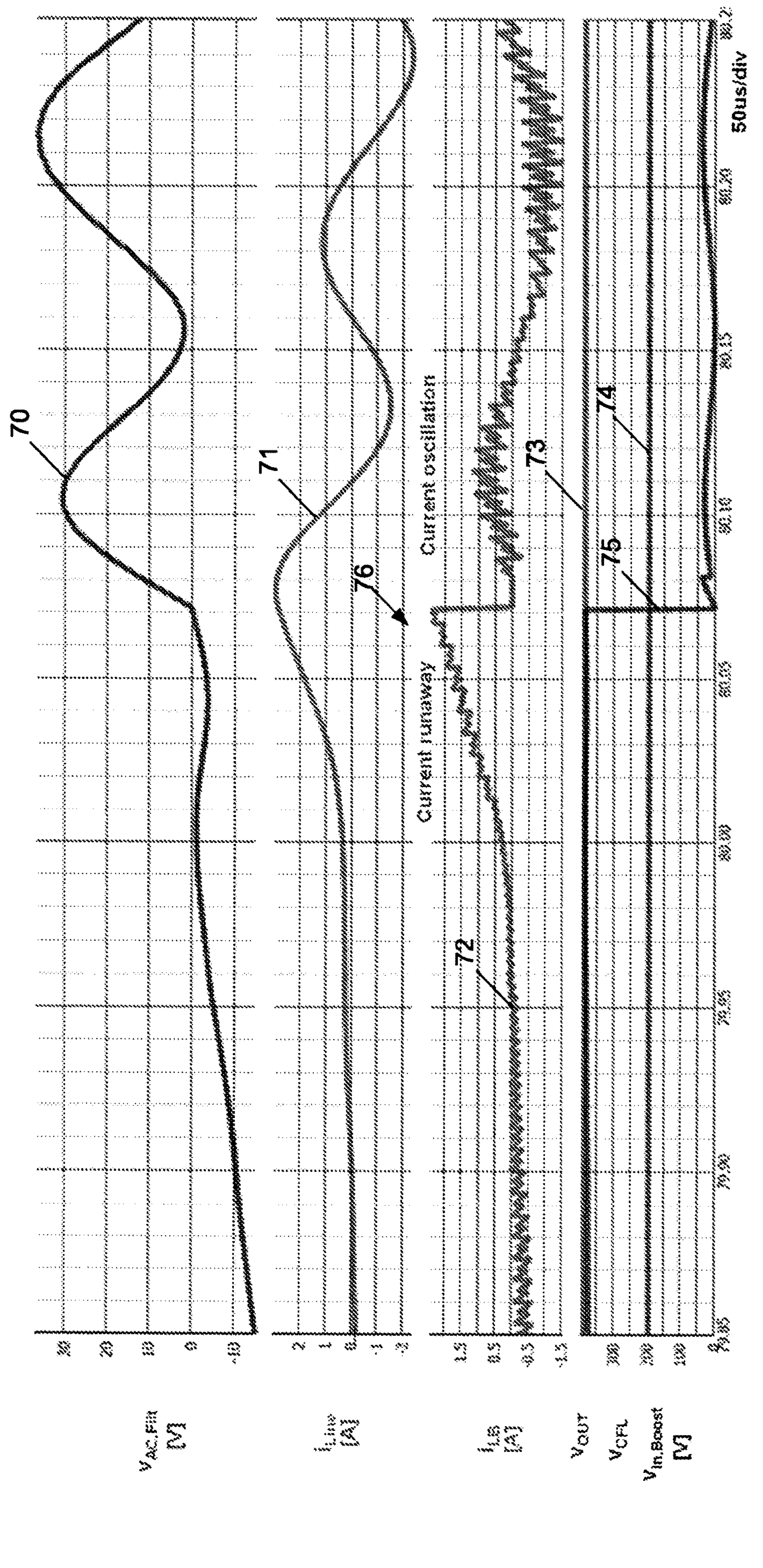
FIG. 7B shows the important waveforms of FIG. 7A zoomed in around a zero-crossing of the line voltage.

Important voltage and current waveforms that illustrate the operation of a flying capacitor 3-level (FC3L) bridgeless totem-pole boost PFC are shown in FIGS. 6 (including FIGS. 6A-6B) and 7 (including FIGS. 7A-7B), respectively for operation without duty cycle limitation and with duty cycle limitation. It is noted that all waveforms shown in the figures and described herein are simulated waveforms. The waveforms in FIG. 6, from top to bottom, are the waveforms of the line voltage after the EMI filter 60, line current 61, boost inductor current 62 (representing the inductor current ripple with alternating wide and narrow bands), output voltage 63, flying capacitor voltage 64, and the boost input voltage 65 obtained on a 2.5 KW boost PFC converter at 220-Vrms/50-Hz line voltage, 385-V output voltage, and 50% of load. Similarly, the waveforms in FIG. 7, from top to bottom, are the waveforms of the line voltage after the EMI filter 70, line current 71, boost inductor current 72, output voltage 73, flying capacitor voltage 74, and the boost input voltage 75 obtained on a 2.5 KW boost PFC converter at 220-Vrms/50-Hz line voltage, 385-V output voltage, and 50% of load. Notably, these waveforms are for a 3-level FCML bridgeless totem pole boost PFC, as contrasted to 2-level, as evident, for instance, by observing the boost inductor current waveform 62. For instance, the ripple is inherently zero valued at four instances (at two zero-crossing instances of the line voltage and at two instances where the line voltage is equal to one-half of the output voltage) along each half-line waveform for a 3-level bridgeless totem-pole boost PFC circuit, which is contrasted with the zero valued ripple instances at only the zero-crossings (i.e., two instances) of the line voltage for a 2-level boost PFC. As shown in FIG. 7A, the line current for operation with duty cycle limitation is significantly distorted (e.g., distortion of 5.2% versus 0.43% in FIG. 6A) around the zero-crossings of the line voltage. In FIGS. 6B and 7B, the waveforms of FIGS. 6A and 7A are zoomed in around a zero-crossing of the line voltage from the negative to positive half-line cycle. In FIG. 7B, current runaway 76 of the boost inductor current around the zero-crossing of the line voltage is clearly shown. In fact, around the zero-crossing of the line voltage, the boost inductor current during the (1-D) $T_{SW}$ interval, when the synchronous rectifiers conduct the current, changes with a large slope. Due to the duty cycle limitation, the (1-D)$T_{SW}$ interval is increased and, consequently, the change in the boost inductor current is increased (e.g., given the ability of the current flow to change direction in the synchronous rectifiers). This increased change in the boost inductor current in a few consecutive CCM switching cycles results in the current runaway.

Figure 8A:
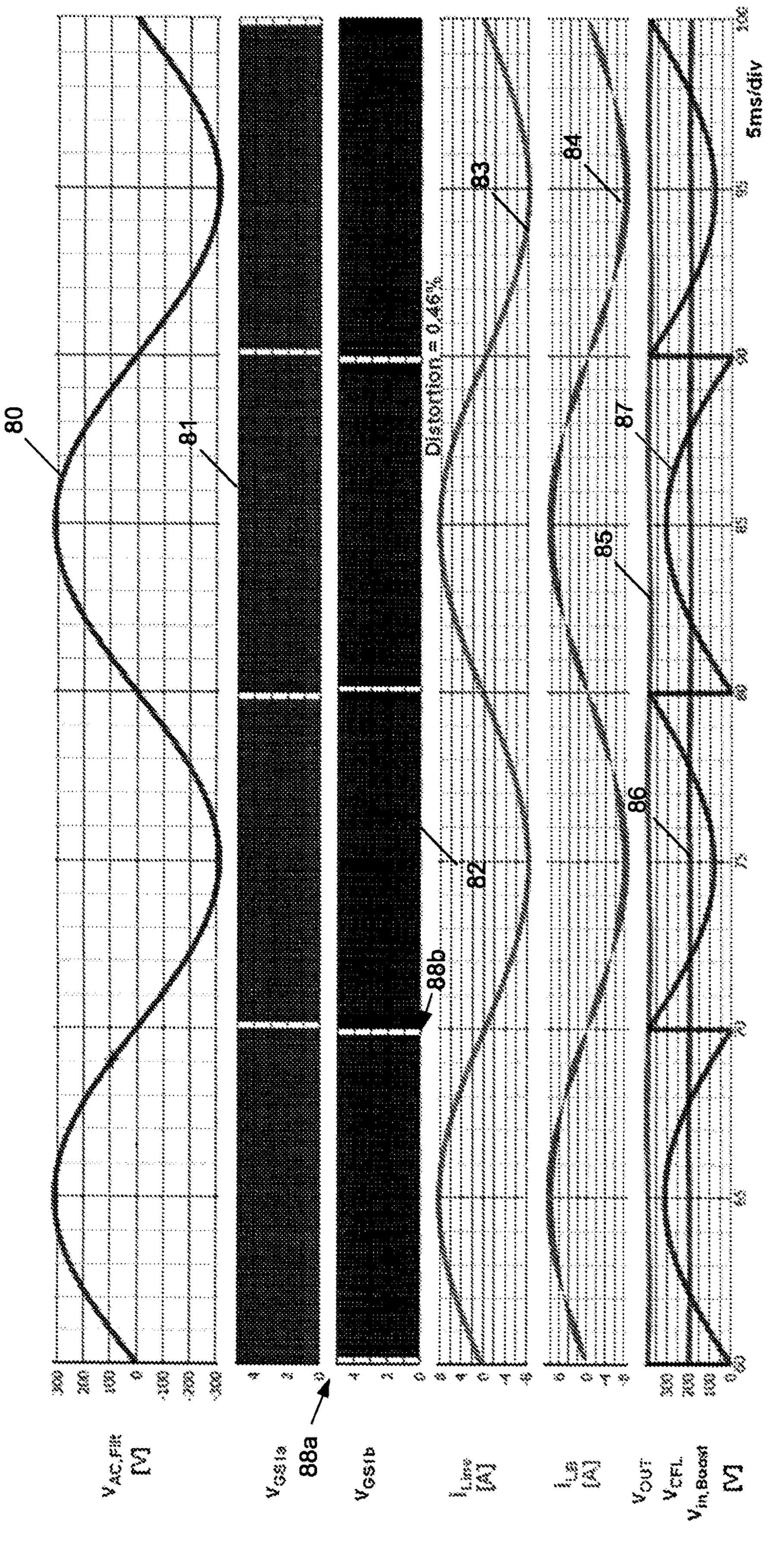
FIG. 8A shows important waveforms obtained on an example 3-level FCML bridgeless totem-pole boost PFC converter at 50% load when operating according to one embodiment of the present invention.
Figure 8B:
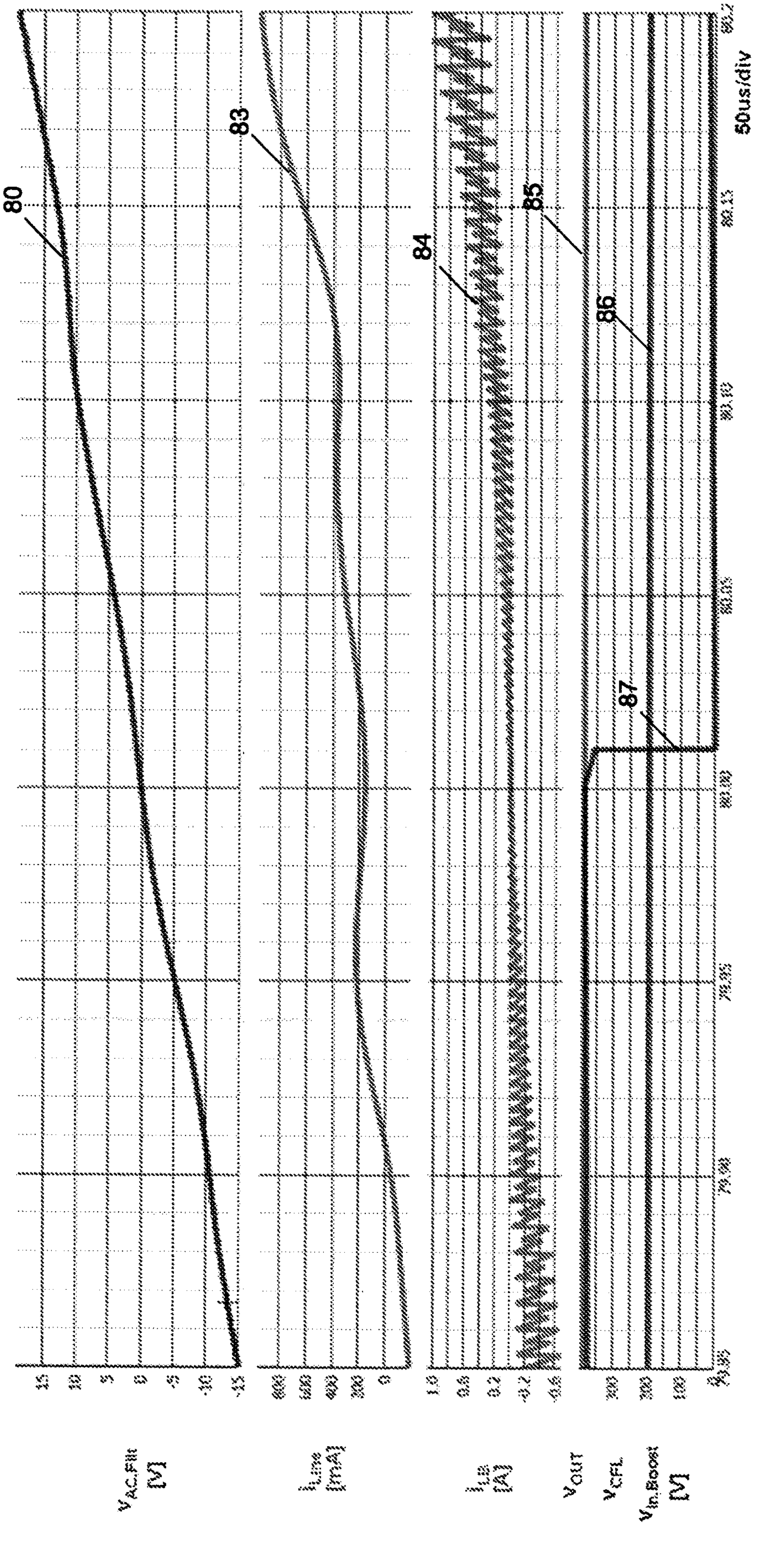
FIG. 8B shows the important waveforms of FIG. 8A zoomed in around a zero-crossing of the line voltage.

According to one embodiment of the present invention, the spikes in the line current waveform around the zero-crossings of the line voltage due to the duty cycle limitation are eliminated by blanking (disabling) the gate-drive pulses of the totem-pole SR switches around the zero-crossings of the line voltage and, consequently, disabling the operation of the boost inductor in CCM (e.g., changing the operation of the boost inductor from CCM to DCM). In one embodiment, the blanking of the gate-drive pulses may be controlled by the control component 56 (FIG. 5). For instance, in one embodiment, the control component 56 may output blanking pulses that are multiplied with gate-drive pulses (e.g., both input into an AND gate) based on detection or sensing (e.g., using voltage comparators, or other known methods) of the zero-crossing points of the line voltage. When the blanking pulses are zero-valued, the output of the AND gate is zero, resulting in a disabling of the gate-drive pulses and a corresponding blanking interval. At light loads (e.g., below 10% of the full load), the totem-pole SR switches can be disabled in the whole half-line cycle (e.g., during the entire interval of the half-line cycle). For instance, as the load decreases, the blanking gaps or intervals increase, up to spanning the entire half-line cycle. Important voltage and current waveforms that illustrate the operation of a flying-capacitor, 3-level bridgeless totem-pole boost PFC (such as shown by device 50 of FIG. 5) with blanking of the gate-drive pulses of the totem-pole SR switches around the zero-crossings of the line voltage are shown in FIG. 8 (which includes FIGS. 8A-8B). The waveforms in FIG. 8A, from top to bottom, are the waveforms of the line voltage after the EMI filter 80, the gate-drive pulses (e.g., each of the individual gate-drive pulses omitted from view and collectively represented by a darkened block) of the inner switches $S_{1a}$ 81 and $S_{1b}$ 82, the waveforms of the line current 83, boost inductor current 84, output voltage 85, flying capacitor voltage 86, and boost input voltage 87 obtained on a 2.5 KW boost PFC converter at 220-Vrms/50-Hz line voltage, 385-V output voltage, and 50% of load.

With respect to the waveforms 81 and 82, several observations are notable. Focusing primarily on the positive half-line cycle for brevity (with similar principles applied to the negative half-line cycle), in this example, the gate-drive pulses 81 for the switch operating as an active or boost switch (e.g., $S_{1a}$ in FIG. 5) are shown to fill the entire half-line (positive) cycle interval (e.g., from 60-70 milliseconds (ms), inclusive). In other words, $S_{1a}$ is driven during the entire positive half-line cycle. In contrast, the gate-drive pulses 82 for the switch operating as a synchronous rectifier (e.g., $S_{1b}$ in FIG. 5) during the positive half-line cycle occupies less than the entire positive half-line cycle interval. In other words, there is a small window (or interval or gap) 88*a* proximal to (e.g., after) the zero-crossing point and another window or gap 88*b* proximal to (e.g., before) the zero-crossing point of the line voltage due to the blanking of the gate-drive pulses 82 at these respective intervals 88*a*, 88*b*. In other words, the blanking intervals are on each side of zero-crossing points (e.g., after for 88A and before for 88B). The disabling of the synchronous rectifier prevents a change in current direction, thus preventing the current runaway. Similarly, for operations of the switches during the second half-line cycle (negative half-line cycle), the roles of the switches are reversed, with $S_{1a}$ operating now as the synchronous rectifier switch, and $S_{1b}$ operating as the boost switch. Accordingly, as shown in FIG. 8A, the gate-drive pulses 81 drive $S_{1a}$ for less than the entire (negative) half-line cycle interval (e.g., with gaps after and before the zero-crossings proximal the left and right ends of the interval due to the blanking of the gate-drive pulses 81 in these respective intervals), whereas the gate-drive pulses 82 drive $S_{1b}$ for the entire negative half-line cycle interval. This alternating blanking (disabling) pattern is repeated as shown in FIG. 8A. Notably, the line current waveform 83 in FIG. 8A does not exhibit current spikes at zero-crossings of the line voltage (e.g., compared to like waveforms shown in FIGS. 7A-7B), exhibiting a distortion of 0.46%, which is significantly reduced from the waveform distortion shown in FIG. 7A. In FIG. 8B, the waveforms of the line voltage after the EMI filter 80, line current 83, boost inductor current 84, output voltage 85, flying capacitor voltage 86, and boost input voltage 87 in FIG. 8A are zoomed in around a zero-crossing of the line voltage from the negative to positive half-line cycle. As shown in FIG. 8B, the boost inductor current smoothly transitions from negative to positive values at the zero-crossing of the line voltage due to the blanking actions described above.

Figure 9A:
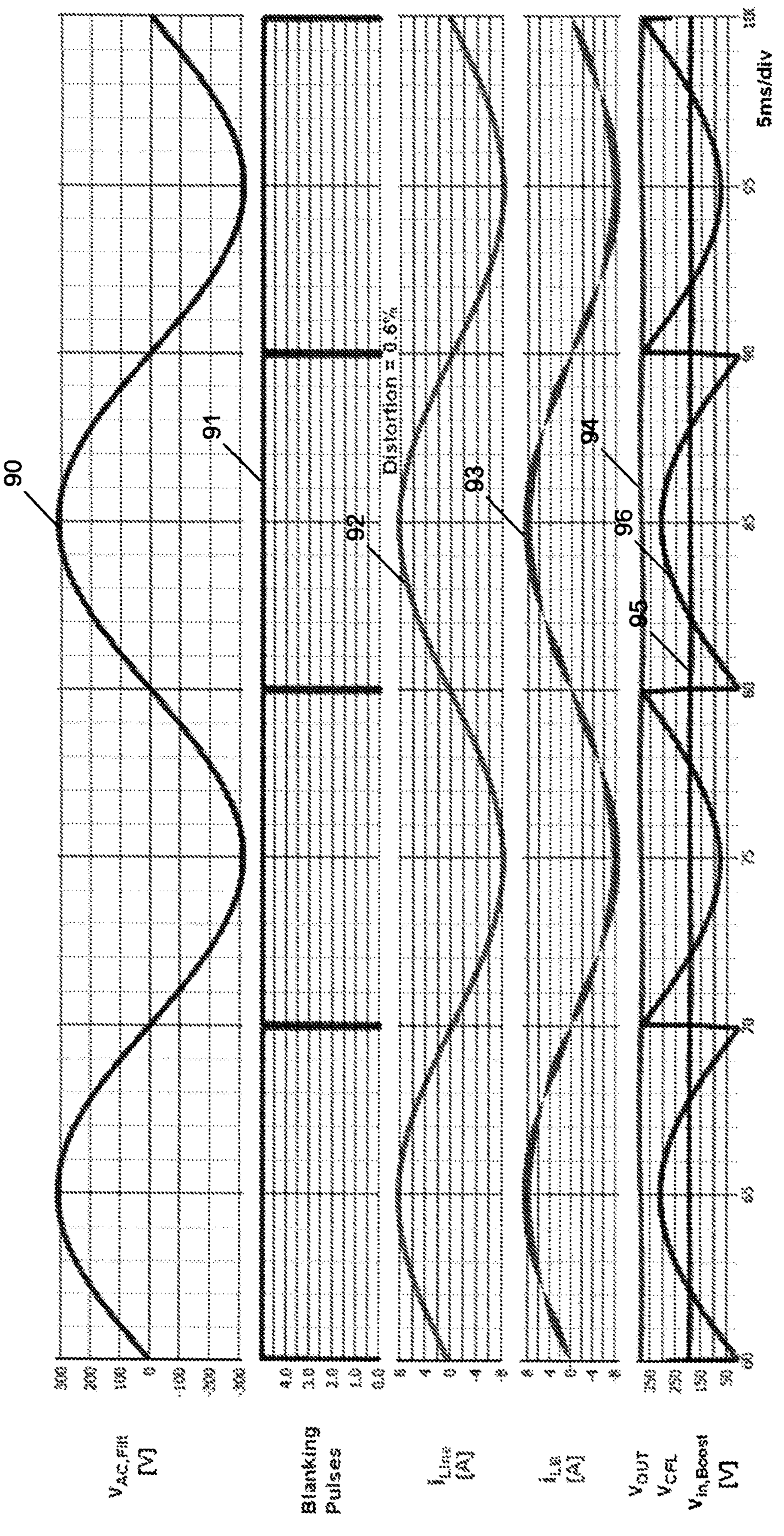
FIG. 9A shows important waveforms obtained on an example 3-level FCML bridgeless totem-pole boost PFC converter at 50% load when operating according to another embodiment of the present invention.
Figure 9B:
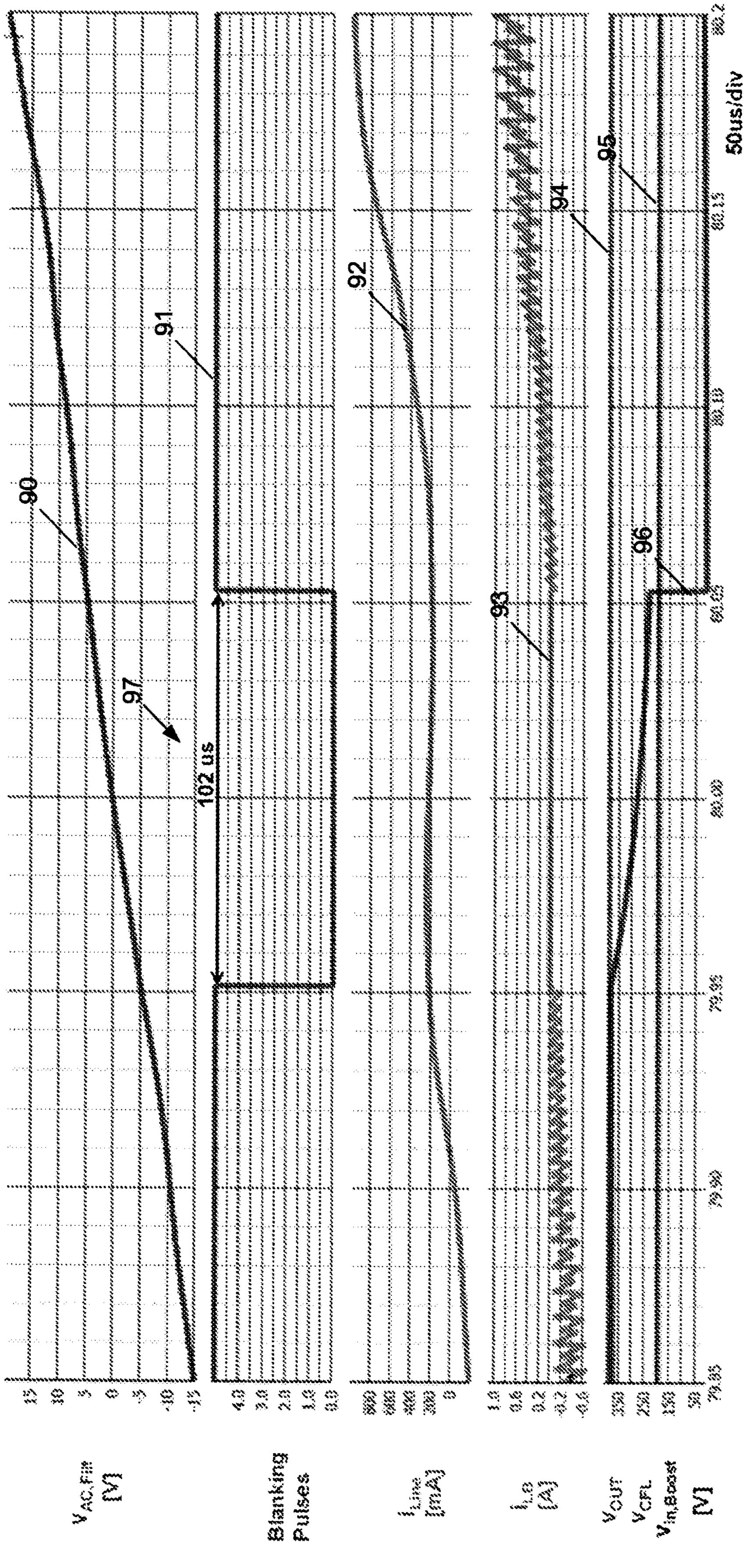
FIG. 9B shows the important waveforms of FIG. 9A zoomed in around a zero-crossing of the line voltage.
Figure 9C:
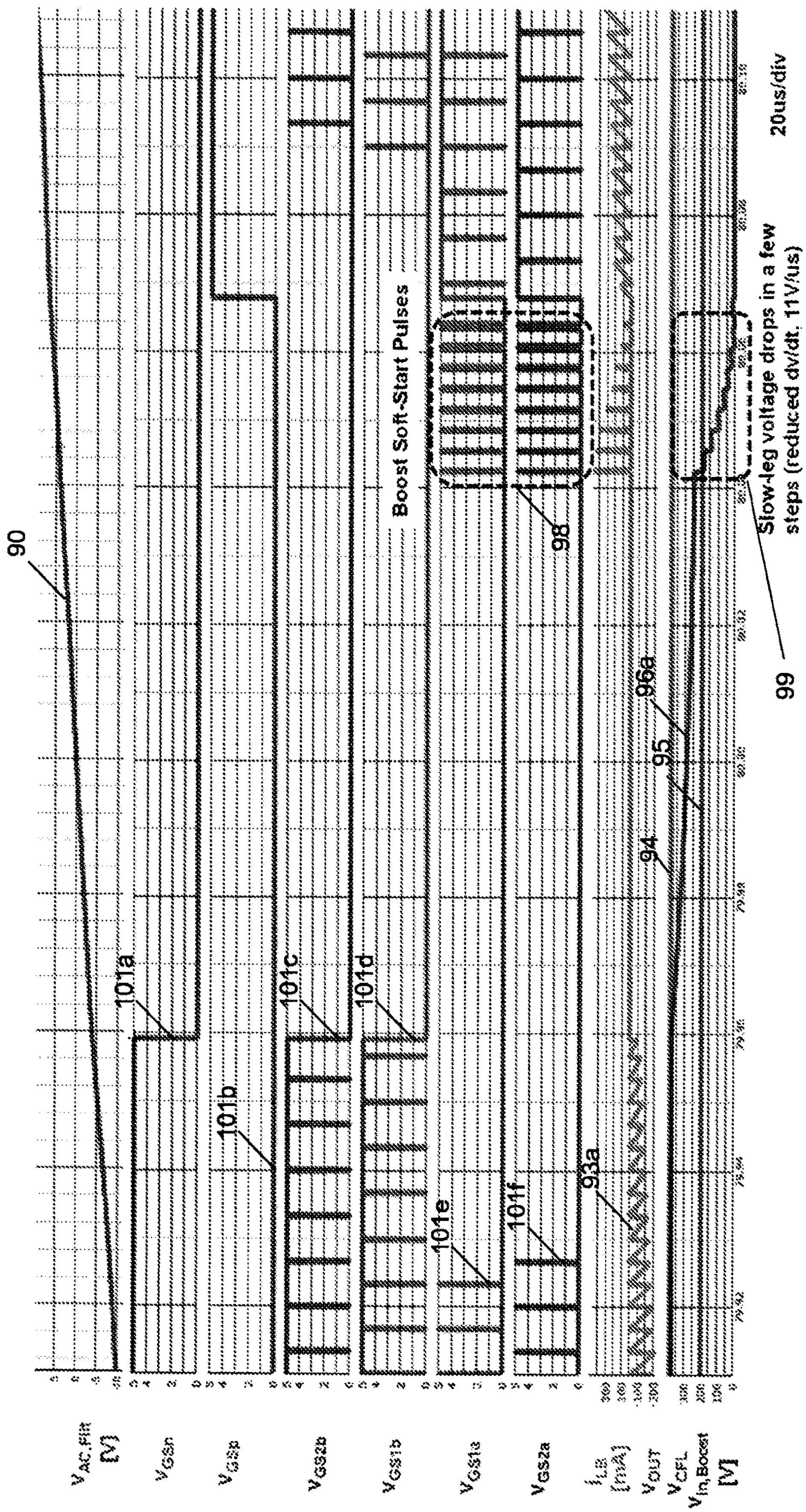
FIG. 9C shows important waveforms obtained on an example 3-level FCML bridgeless totem-pole boost PFC converter at 50% load when operating according to yet another embodiment of the present invention.

According to another embodiment of the present invention, the spikes in the line current waveform around the zero-crossings of the line voltage due to the duty cycle limitation are eliminated by blanking (disabling) the gate-drive pulses of all (e.g., in FIG. 5, all six) switches around the zero-crossings of the line voltage (e.g., by blanking the gate-drive pulses of both the fast leg switches and the slow leg switches) and, consequently, freezing the boost inductor current to zero during the blanking interval. In one embodiment, the blanking of the gate-drive pulses may be controlled by the control component 56 (FIG. 5) via the use of blanking pulses, as similarly described above. Important voltage and current waveforms that illustrate the operation of a flying-capacitor, 3-level bridgeless totem-pole boost PFC (e.g., as shown by device 50 in FIG. 5) with blanking the gate-drive pulses of all switches around the zero-crossings of the line voltage are shown in FIG. 9 (which includes FIGS. 9A-9C). The waveforms in FIGS. 9A-9B, from top to bottom, are the waveforms of the line voltage after the EMI filter 90, the blanking pulses 91 (note that blanking occurs at zero level of the blanking pulses), the waveforms of the line current 92, boost inductor current 93, output voltage 94, flying capacitor voltage 95, and the boost input voltage 96 obtained on a 2.5 KW boost PFC converter at 220-Vrms/50-Hz line voltage, 385-V output voltage, and 50% of load. As best shown in close-up in FIG. 9B, in one embodiment, a zero level interval 97 corresponding to the blanking pulses 91 spans or extends from both sides of the zero level crossing, including at the zero level crossing), in contrast to the blanking intervals (e.g., only before or after the zero-crossing points) of the previous embodiment (e.g., FIG. 8A). Though the zero level interval 97 is depicted as having a duration of 102 microseconds, it should be appreciated that this value is merely illustrative of one application and that other values may be used. In one embodiment, the width or duration of the zero level interval 97 may be adjusted based on a desired voltage range of zero-crossing sensing of the line voltage, such as through the use of comparator logic. For instance, narrower intervals may be based on a narrower comparison range, and wider intervals may be achieved based on using a wider comparison range. In some embodiments, different zero level intervals may be implemented for different switches, as explained further below. As shown in FIG. 9A, the line current waveform 92 does not exhibit current spikes at zero-crossings of the line voltage, exhibiting very low distortion (e.g., 0.6%, as shown in FIG. 9A). In FIG. 9B, the waveforms in FIG. 9A are zoomed in around a zero-crossing of the line voltage. As shown in FIG. 9B, the boost inductor current has zero value during the blanking interval around (e.g., at, and on both sides of) the zero-crossing of the line voltage.

Though the blanking interval shown in FIGS. 9A-9B is the same for all fast and slow leg switches, in some embodiments, a more flexible approach to blanking may be used to improve performance. That is, according to yet another embodiment of the current invention, the blanking interval is different for the slow-leg SR switches (e.g., Sn, Sp of FIG. 5), the fast-leg boost switches, and the fast-leg SR switches. Referring to FIG. 9C, shown from top to bottom are waveforms for the line voltage after the EMI filter 90, gate-drive pulses 101*a*, 101*b*, 101*c*, 101*d*, 101*e*, and 101*f* for the respective switches (e.g., using the circuit 52 of FIG. 5) Sn, Sp, $S_{2b}$, $S_{1b}$, $S_{1a}$, and $S_{2a}$, boost inductor current 93*a*, output voltage 94, flying capacitor voltage 95, and the boost input voltage 96*a* around the zero-crossing of the line voltage from negative to positive half line cycles (e.g., with zero-crossing point at time mark 80.00). The waveforms in FIG. 9C are obtained on a 2.5 KW boost PFC converter at 220-Vrms/50-Hz line voltage, 385-V output voltage, and 50% of load. Generally, in the example depicted in FIG. 9C, the blanking interval for the fast-leg boost switches is slightly narrower than that of the slow-leg SR switches, and the blanking interval for the fast-leg SR switches is slightly wider than that of the slow-leg SR switches. For example, after the zero-crossing of the line voltage, $S_{1a}$ and $S_{2a}$ are the fast-leg boost switches, Sp is the slow-leg SR switch, and $S_{2b}$ and S, are the slow-leg SR switches. Note that some embodiments may use intervals of different relative widths, and that intervals may differ among the different types of switches in various combinations. An example of different blanking intervals for the slow-leg SR switches, fast-leg boost switches, and fast-leg SR switches is presented in FIG. 9C. For instance, the waveform 101*a* for slow-leg SR switch ($S_n$ in FIG. 5) shows the gate-drive pulse (VGsn) having a blanking interval beginning proximal to (e.g., immediately before) the time mark of 79.96, and which begins before the zero-crossing point of the line voltage 90 (approximately at time mark 80.00) and extends past (to the right of) the zero-crossing point. The waveform 101*b* for the gate-drive pulse $V_{GSp}$ of the slow-leg SR switch ($S_p$) has a blanking interval that also spans both sides of the zero-crossing point and which ends proximal to (e.g., immediately before) the 80.07 time mark. The waveforms 101*c*, 101*d* for the upper two totem-pole switches in FIG. 5, $S_{2b}$ and $S_{1b}$ respectively, which during the negative half-line cycle (to the left of the zero-crossing point) serve the role of fast boost switches and to the right of the zero-crossing point serve the role of fast-leg SR switches, show respective gate-drive pulses, $V_{GS2b}$, $V_{GS1b}$ with the longest duration blanking intervals among the switches and which span on both sides of the zero-crossing point. Notably, the gate-drive pulses, $V_{GS2b}$, $V_{GS1b}$ are phase shifted relative to each other. The waveforms 101*e*, 101*f* for the lower two totem-pole switches in FIG. 5, $S_{1a}$ and $S_{2a}$ respectively, which during the negative half-line cycle (to the left of the zero-crossing point) serve the role of fast leg SR switches and to the right of the zero-crossing point serve the role of fast-leg boost switches, show respective phase-shifted gate-drive pulses, $V_{GS1a}$, $V_{GS2a}$ with the shortest or narrowest duration blanking intervals among the switches and which also span on both sides of the zero-crossing point. It bears noting that in a two-level configuration, the outer pair of switches in FIG. 5 (e.g., $S_{2a}$ and $S_{2b}$), and thus gate-drive pulse waveforms 101*f* and 101*c*, do not exist. Again, one result of these different blanking intervals among all of the switches is to eliminate the spikes around the zero-crossing and maintain the inductor current at zero value during the blanking intervals. As explained above, some embodiments use the same blanking interval for all of the switches, whereas some embodiments use different blanking intervals for the different types of switches (e.g., different for fast-leg, slow-leg, and boost switches). In general, given the different topologies of the switches for performing respective roles (e.g., boost switch, fast and slow leg SR), which changes depending on which side of the zero-crossing is the current interval, the blanking intervals before the zero-crossing point are different than the blanking intervals after the zero-crossing point. Note that the examples described above are for illustration, and that any combination of blanking intervals may be used. For example, in FIG. 90, before the zero-crossing of the line voltage, slow-leg synchronous rectifier switch $S_n$ and fast-leg boost switches $S_{1b}$ and $S_{2b}$ may be disabled at the same instant.

FIG. 9C also shows the use of boost soft-start pulses 98. Referring back to FIG. 9B, it is notable that the slow-leg midpoint voltage, represented by the waveform corresponding to the boost input voltage 96, shows a gradual change corresponding to the duration of the blanking interval 97 followed by an abrupt change or large dv/dt corresponding to the end of the blanking interval or start of the boost gate-drive pulses. A large dv/dt degrades the EMI. Accordingly, certain embodiments use the boost soft-start pulses 98 to provide for a more controlled dv/dt. In other words, the narrow soft-start pulses 98 control the decrease of the slow-leg midpoint voltage 99 so that the dv/dt is reduced (e.g., approximately 11 volts/microsecond, where as a general rule, the dv/dt should not exceed 20 volts/microsecond), resulting in improved EMI. The boost soft-start pulses 98 are applied right after the end of the blanking interval for the fast-leg boost switches. The boost soft-start pulses 98 are generated with an open-loop control (e.g., via a pulsed generator, versus using the closed-loop gate-drive pulses). Through the use of open-loop control, the boost soft start pulses may be flexibly configured as needed for improved performance, such as through adjustments in the number of pulses, frequency, and pulse width. For instance, in the example depicted in FIG. 9C, it is noted that the boost soft start pulses become progressively wider, yet are of a higher frequency than regular/drive boost pulses. Note that in some embodiments, the width may remain the same throughout the soft-start duration. It should be noted that the boost soft-start pulses 98 are the same for the inner and outer boost switches (e.g., same frequency, voltage, pulse width), with no phase shift (e.g., controlled at the same time) as compared to the phase-shifted gate-drive pulses for inner and outer switches as explained above. For instance, phase-shifting of the gate-drive pulses is intended to increase (e.g., double) the ripple frequency, which in turn enables a reduction in the volume of the inductor. On the other hand, operation of the boost soft-start pulses 98 has as one of its goals to reduce the peak value of the $I_{LB}$ current pulses. One mechanism to achieve that goal is to reduce the width of the first boost soft-start pulse (which as shown in FIG. 9C, generates the largest peak $I_{LB}$ pulse), though as indicated above, the width of each soft-start pulse may remain the same. Another and/or additional mechanism to achieve this goal is to increase the frequency of the boost soft-start pulses 98 (e.g., much higher than the frequency of the gate-drive pulses), which enables the soft-start pulses to be narrow and thus limit the peak values of $I_{LB}$, as shown by the gradual decrease in peak values in FIG. 9C.

It should be also noted that during the boost soft-start interval, there is no current flow through the flying capacitor (e.g., referring to FIG. 5, the boost switches $S_{1a}$ and $S_{2a}$ (and similarly, when $S_{1b}$ and $S_{2b}$ serve the role of boost switches) are both on at the same time and thus provide for a short circuit arrangement, so current naturally flows through those switches as opposed to being bypassed through the flying capacitor) and, therefore, during the boost soft-start interval, the flying capacitor voltage does not change. During the boost soft-start interval, the closed-loop boost pulses are disabled. At the end of the boost soft-start interval, the slow-leg SR switch is turned on. After the slow-leg SR switch is turned on, the fast-leg SR switches are enabled after a short delay. As already mentioned, the waveforms in FIG. 9C are obtained at the zero-crossing of the line voltage from the negative to positive half-line cycle. The waveforms at the zero-crossing of the line voltage from the positive to negative half-line cycle are similar to the waveforms in FIG. 9C, with the difference that the fast-leg boost switches are the totem-pole upper switches, $S_{1b}$ and $S_{2b}$, and the fast-leg SR switches are the totem-pole bottom switches, $S_{1a}$ and $S_{2a}$. Also, the slow-leg SR switch is the upper switch $S_n$ and the slow-leg midpoint voltage Vin, Boost increases with a reduced dv/dt slope controlled by the boost soft-start pulses.

Figure 10:
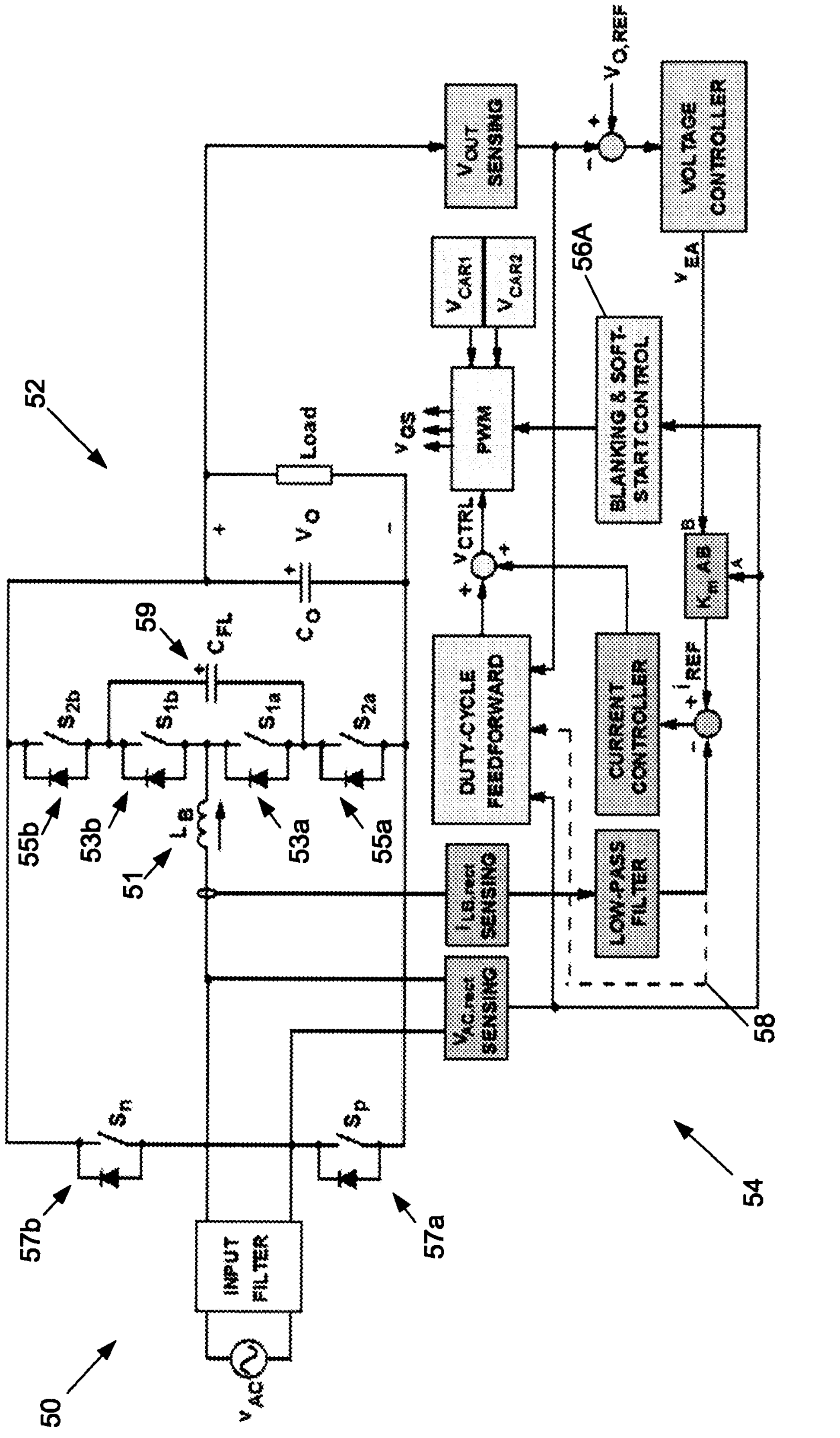
FIG. 10 shows a block diagram of an example control circuit of the 3-level FCML bridgeless totem-pole boost PFC converter with average current control and with blanking control of all switches around the zero-crossing of the line voltage according to an embodiment of the present invention.

FIG. 10 shows one embodiment of the FCML bridgeless totem pole boost PFC device 50 (described in FIG. 5, with like elements for FIGS. 5 and 10 identified using the same reference numbers, the description of which is omitted here for brevity except where noted below) comprising the 3-level FCML bridgeless totem pole boost PFC circuit 52 and the control circuit 54 (as described in FIG. 5), where the control component 56 comprises blanking control and boost soft-start functionality (the latter also denoted and referred to as blanking control and boost soft-start component 56A). Note that the additional input reflected by reference numeral 58 is optional, as represented by the dashed line. The blanking control and boost soft-start functionality 56A are as described above in association with FIG. 9, and hence discussion of the same is omitted for brevity.

Figure 11:
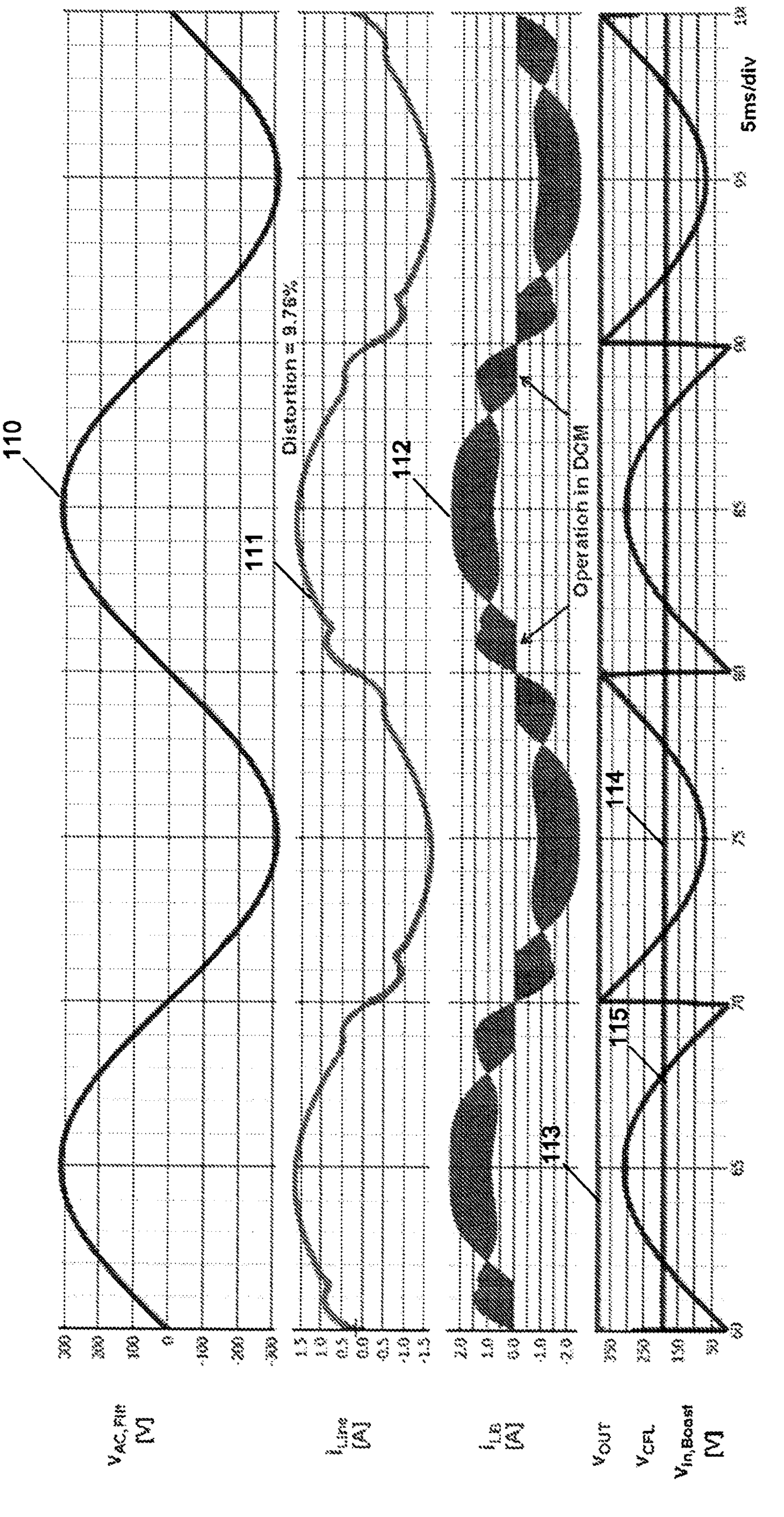
FIG. 11 shows important waveforms obtained on an example 3-level FCML bridgeless totem-pole boost PFC converter at 10% load.

With decreasing loads, the boost inductor will operate in DCM in wider intervals around the zero-crossings of the line voltage, and the CCM duty-cycle feedforward control, when implemented according to Equation (1), may result in additional distortion of the line current as illustrated in FIG. 11. The waveforms in FIG. 11, from top to bottom, are the waveforms of the line voltage after the EMI filter 110, line current 111, boost inductor current 112, output voltage 113, flying capacitor voltage 114, and the boost input voltage 115. The waveforms are obtained on a 2.5 kW FC3L bridgeless totem-pole boost PFC converter at 220-Vrms/50-Hz line voltage, 385-V output voltage, and 10% of load. As shown in FIG. 11, DCM operation (where the current reaches zero, as opposed to continuous conduction mode where the current does not reach zero) of the boost inductor in a wider interval around the zero-crossing of the line voltage results in elevated absolute instantaneous values of the line current during the intervals of the boost inductor current with DCM operation and, consequently, in increased distortion (e.g., 9.76%) of the line current. For instance, as the load decreases, DCM becomes more prevalent. Using a CCM-duty cycle feedforward control when operation is predominantly DCM results in increased distortion.

Figure 12:
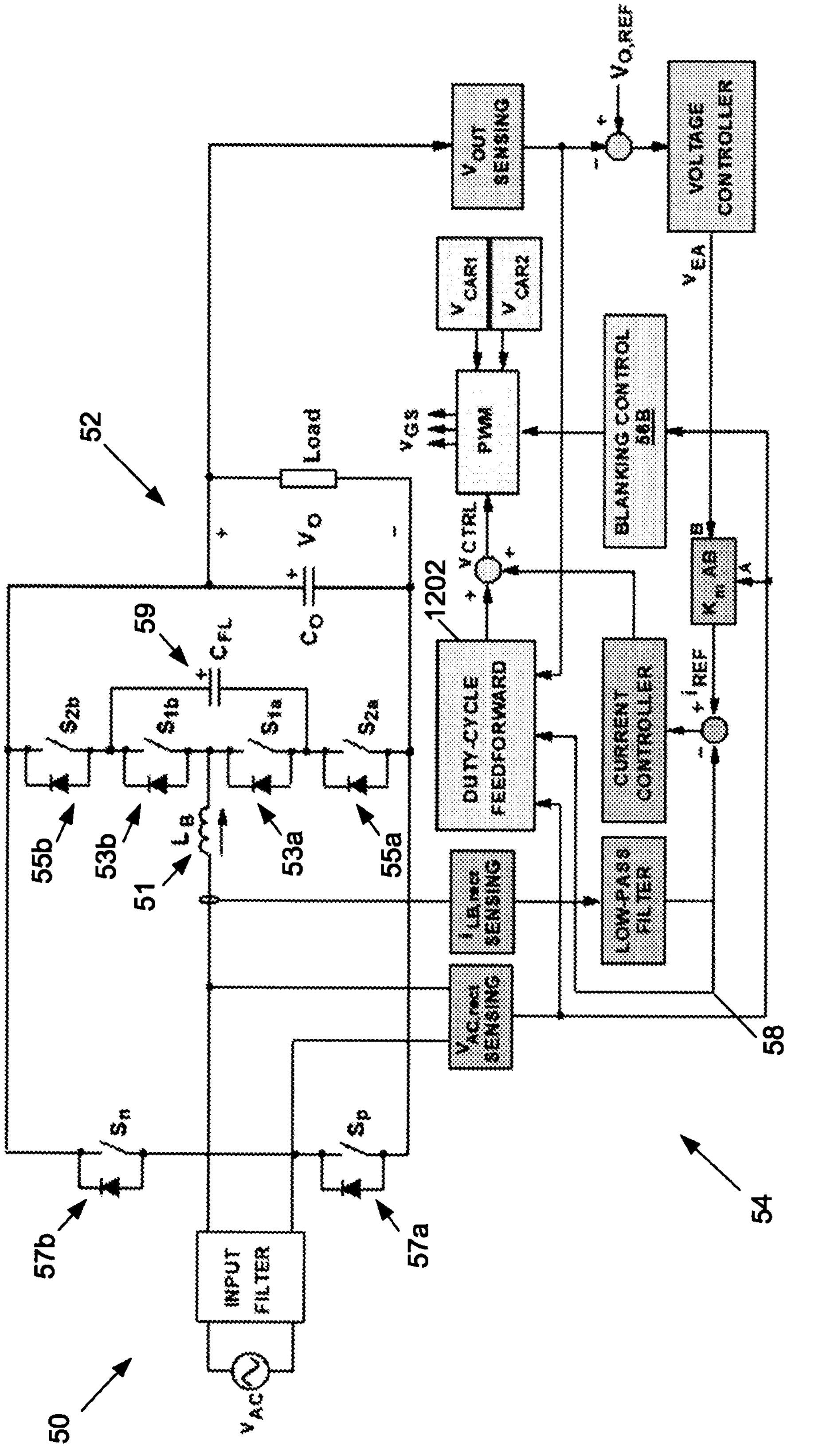
FIG. 12 shows a block diagram of an example control circuit of the 3-level FCML bridgeless totem-pole boost PFC converter with average current control and with mixed duty-cycle feedforward control according to an embodiment of the present invention.

According to yet another embodiment of the current invention, for proper operation of the boost inductor in DCM, the CCM duty-cycle feedforward (e.g., pre-calculated, versus based on feedback) control according to Equation (1) is replaced with DCM duty-cycle feedforward control, according to Equations (2) and (3):

$$D_{FF,DCM1} = 0.5 + \sqrt{L_B f_{SW}\left(1 - \frac{2|v_{IN}|}{V_O}\right)\frac{I_{IN,RMS}}{V_{IN,RMS}}} \ @ \ |v_{IN}| \leq \frac{V_O}{2}, \quad (2)$$

and $$D_{FF,DCM2} = \sqrt{2L_B f_{SW}\frac{1 - \frac{|v_{IN}|}{V_O}}{1 - \frac{V_O}{2|v_{IN}|}}\frac{I_{IN,RMS}}{V_{IN,RMS}}} \ @ \ |v_{IN}| > \frac{V_O}{2}, \quad (3)$$

where, $L_B$ is the boost inductance, $f_{SW}$ is the switching frequency, $|v_{IN}|$ is the rectified line voltage, $I_{IN,RMS}$ is the RMS value of the line current, $V_{IN,RMS}$ is the RMS value of the line voltage, and $V_O$ is the output voltage of the PFC converter. The RMS value may be obtained, for instance, after sampling and accumulating the samples over a given period (e.g., half-line cycle, full cycle, etc.) and then dividing by the number of samples. Notably, though the expressions in Equations (2) and (3) are more complicated than the expression of Equation (1), implementation is not as daunting. For instance, like in CCM, DCM requires Vo and VIN. Also, parameters such as $L_B$ and $f_{SW}$ need not be measured as they are generally constants, though in some embodiments, $L_B$ may be measured as part of an initialization or calibration. Accordingly, measured values include $V_O$ and $V_{IN}$, as currently sensed in existing control circuits (e.g., control circuit 54), with the addition of the measured (e.g., as sensed using any one of known technologies, such as through the use of Hall effect sensors) input current (from which the RMS value may be determined), as filtered, used as input 58 to the duty-cycle feedforward component. According to Equations (2) and (3), for DCM duty-cycle feedforward control, the control circuit 54 of FIG. 5 is modified as shown in FIG. 12 (with like elements for FIGS. 5 and 12 identified using the same reference numbers, the description of which is omitted here for brevity except where noted below), including the addition of the filtered, measured current 58 from the low-pass filter that is input to the duty-cycle feedforward block. For instance, shown is the device 50 comprising a 3-level FCML bridgeless totem pole boost PFC circuit 52, as similarly shown in FIG. 5, and the control circuit 54. As explained above, the modification to the control circuit 54 of FIG. 5 focuses in on the addition of the control component 56 embodied in the form of a blanking control component 56B, and the additional input 58 (i.e., in addition to $V_O$ and $V_{IN}$, the sensed input current, $I_{LB}$) to the duty-cycle feedforward component. Note that the blanking control component 56B may include soft start functionality in some embodiments (e.g., similar to blanking control and boost soft-start component 56A in FIG. 10), and omit soft start functionality in other embodiments. Practically, for very light loads (e.g., 10% load), soft start may be omitted, since the distortion around the zero-crossing is primarily due to the use of CCM in DCM operations. With the duty-cycle feedforward including pre-calculated values for DCM operation (e.g., per equations (2) and (3)) according to certain embodiments of the invention, soft start may be omitted in light load situations.

Figure 13:
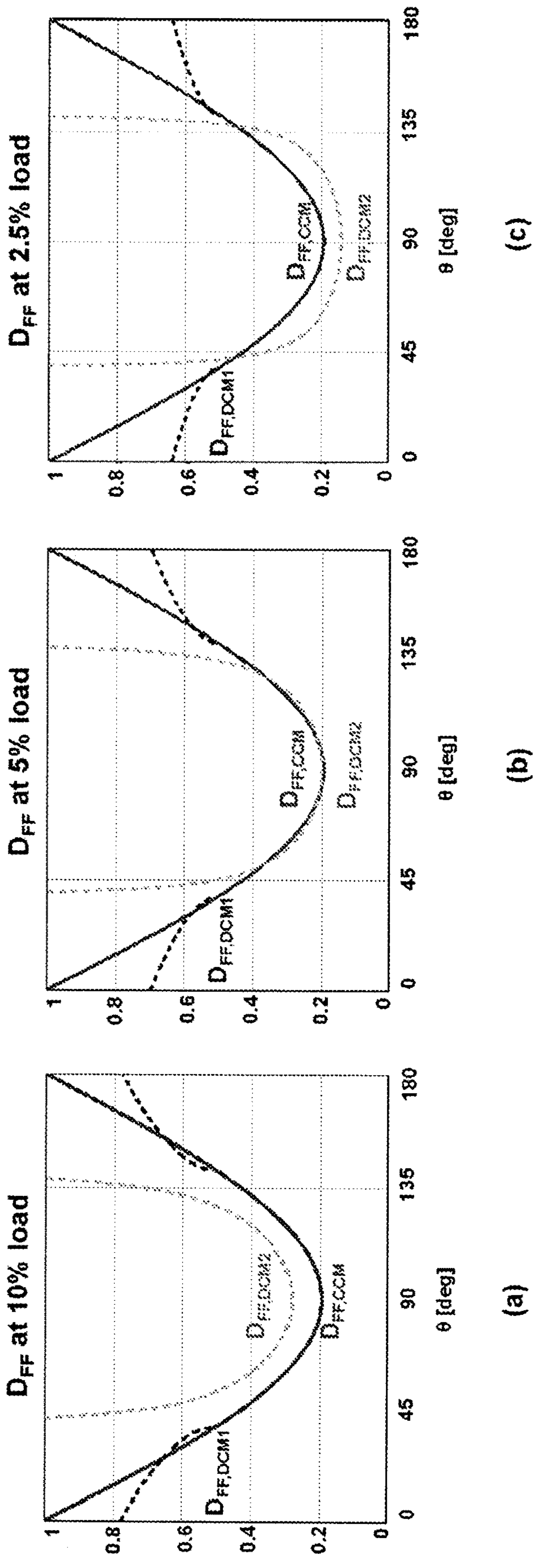
FIG. 13 shows the variation of feedforward duty cycles $D_{FF,CCM}$, $D_{FF,DCM1}$, and $D_{FF,DCM2}$ according to yet another embodiment of the present invention at (a) 10% load, (b) 5% load, and (c) 2.5% load.

Generally, in a half-line cycle, the boost inductor operates in both DCM and CCM, also called mixed conduction mode (MCM). The variation of the three feedforward duty cycles based on Equations (1), (2), and (3) in a half-line cycle for three different loads is illustrated in FIG. 13 (which includes FIGS. 13(*a*), 13(*b*), and 13(*c*)). For instance, if operation is in CCM, the duty cycle is pre-calculated according to Equation (1). For a circuit operating in DCM, if the instantaneous input voltage is less than or equal to half of the output voltage, then Equation (2) is used (e.g., DCM1). For a circuit operating in DCM, if the instantaneous input voltage is greater than half of the output voltage, then Equation (3) is used (DCM2). The correct value of the feedforward duty cycle is obtained by taking the lowest value of the three feedforward duty cycles from Equations (1), (2), and (3). As a result, the takeover between different conduction modes will not cause a jump in the feedforward duty cycle. Notably, in FIGS. 13(*a*), 13(*b*), and 13(*c*), the CCM feedforward duty cycle is the same for the three different load cases. As shown in FIG. 13(*a*), at 10% load, the MCM operation of the boost inductor includes only two modes, CCM and DCM1, with DCM1 lower near the zero-crossing points; whereas, at 5% and 2.5% loads, the MCM includes all the three modes: CCM, DCM1, and DCM2, with DCM2 of more importance at the 2.5% load (having the lowest value for most of the half-line cycle), whereas at 5% load, the overlap between CCM and DCM2 permits selection of DCM1, followed by CCM, and then DCM1 as the lowest values.

At least one distinction is evident between two-level and three-level (and in general, multi-level) boost PFC operations in view of FIG. 13. For instance, even assuming MCM operation for a 2-level configuration, operation would at best involve DCM1 proximal to the zero-crossings and CCM otherwise. Notably, zero-value instances of ripple only occur at zero-crossings of the line voltage in 2-level operations. Further, existing 2-level boost PFCs attempt to enforce a CCM approach, even if operation requires DCM (e.g., see FIG. 11, midway through the half-line cycle), which results in distortion of the line current, particularly at lighter loads. In contrast, certain embodiments of the FC3L bridgeless totem-pole boost PFC as disclosed herein enable DCM operation even around the line voltage peaks (e.g., via DCM2), as evident from FIG. 13. In other words, under an MCM approach, DCM2 operation is enabled for certain embodiments, particularly under light loads, which enables a proper choice of duty-cycle feedforward operation (e.g., DCM2) under these conditions as opposed to attempting to enforce CCM operation where it should not be applied.

Figure 14A:
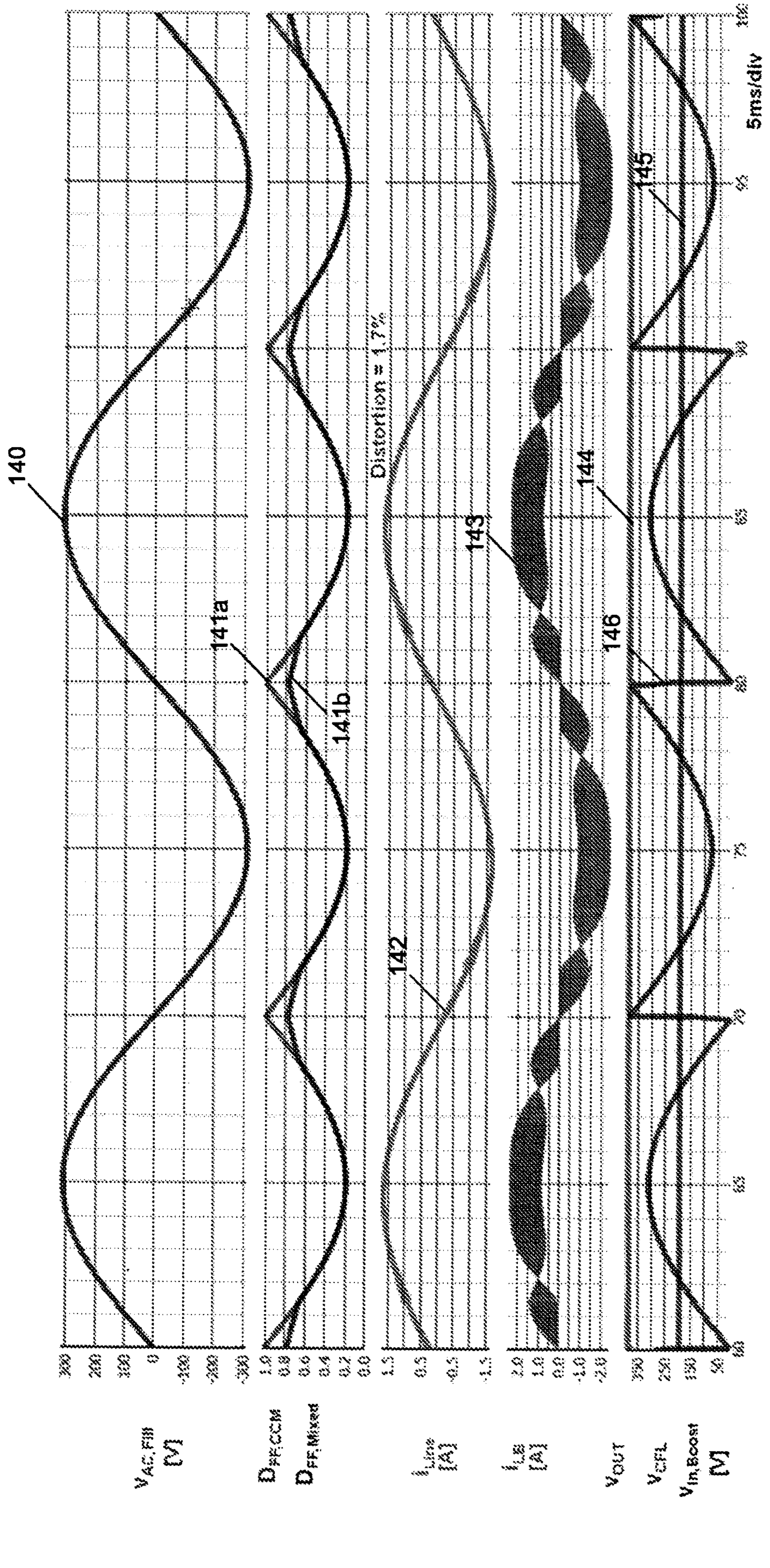
FIG. 14A shows important waveforms obtained on an example 3-level FCML bridgeless totem-pole boost PFC converter at 10% load.
Figure 14B:
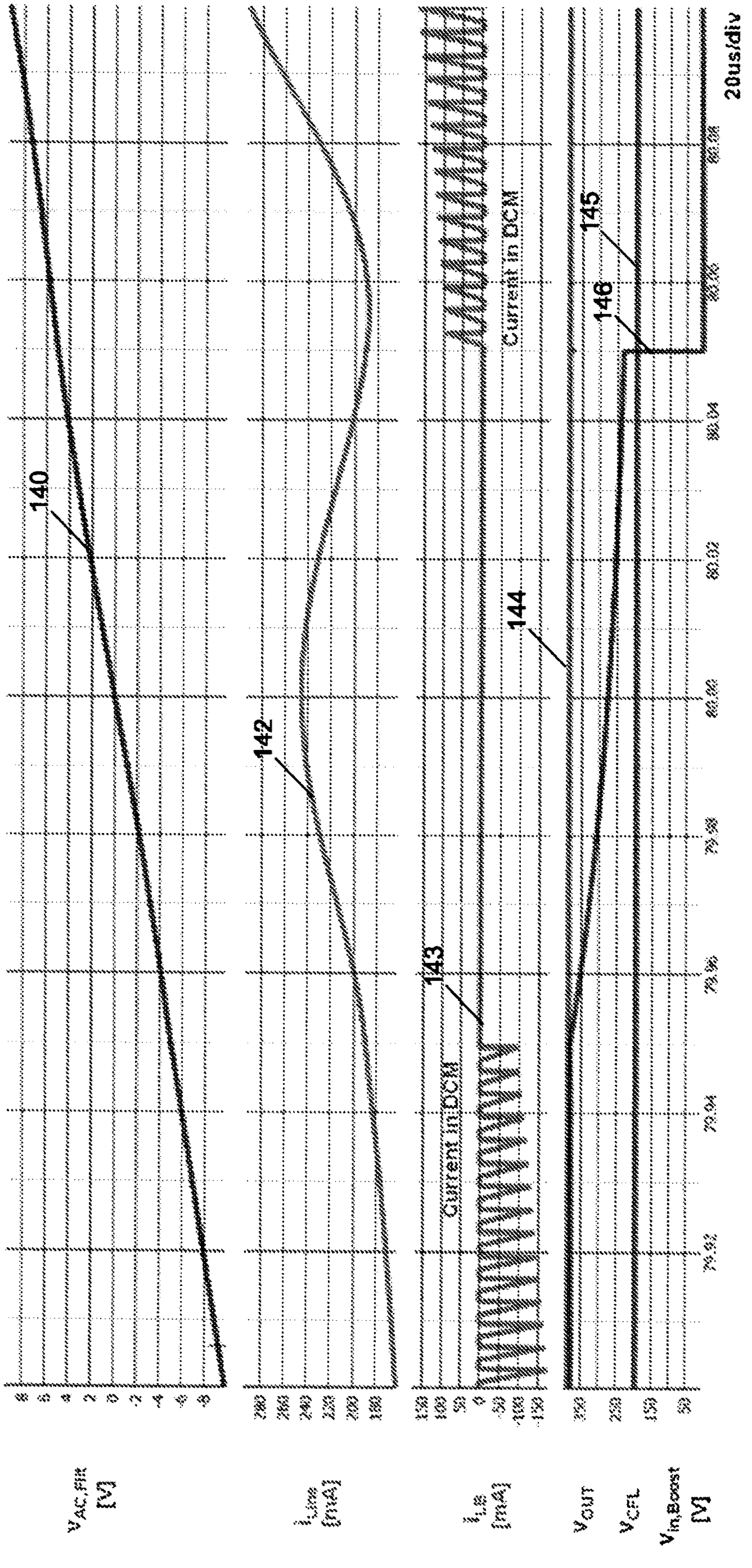
FIG. 14B shows the important waveforms of FIG. 14A zoomed in around a zero-crossing of the line voltage.
Figure 15A:
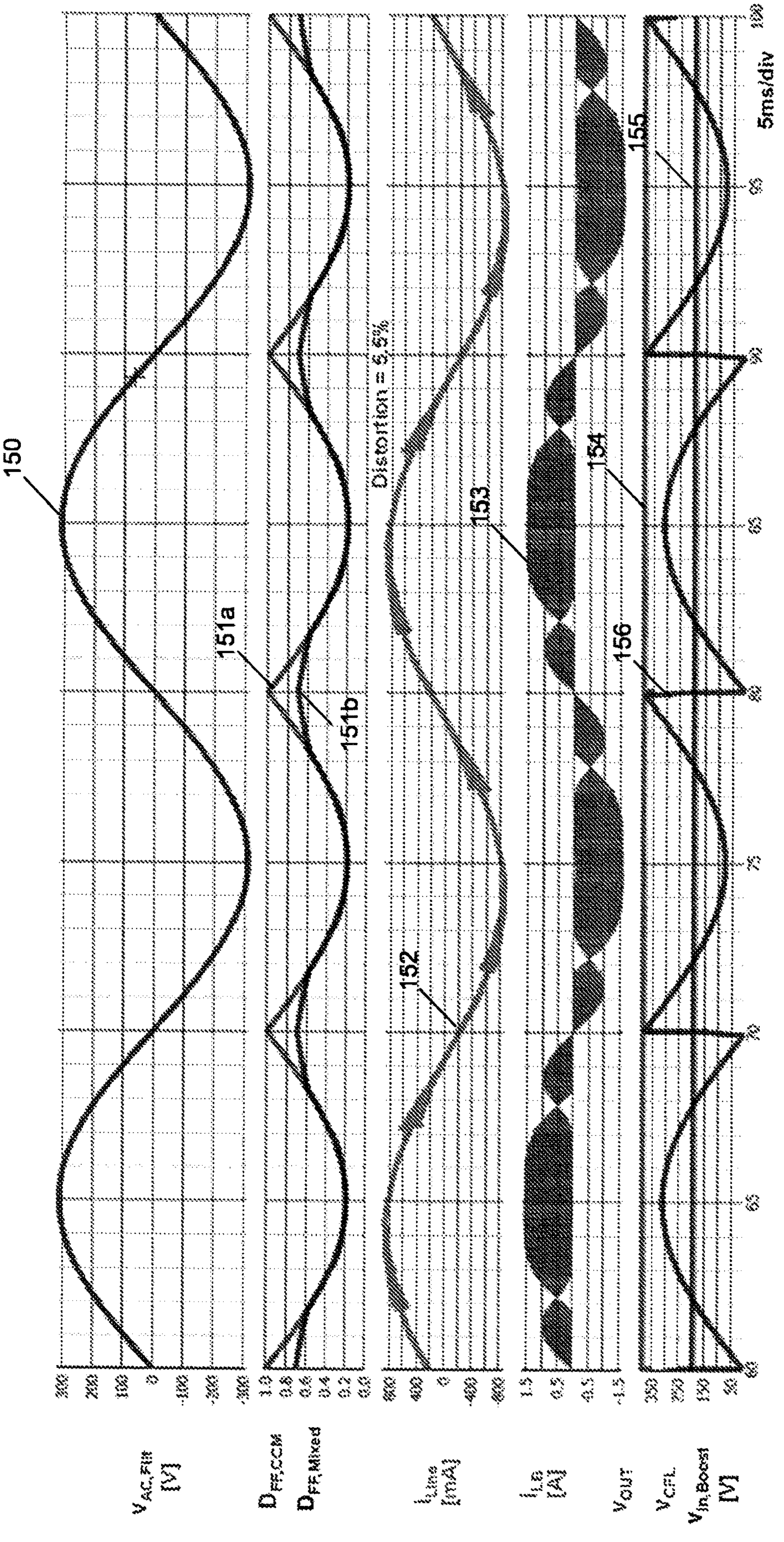
FIG. 15A shows important waveforms obtained on an example 3-level FCML bridgeless totem-pole boost PFC converter at 5% load.
Figure 15B:
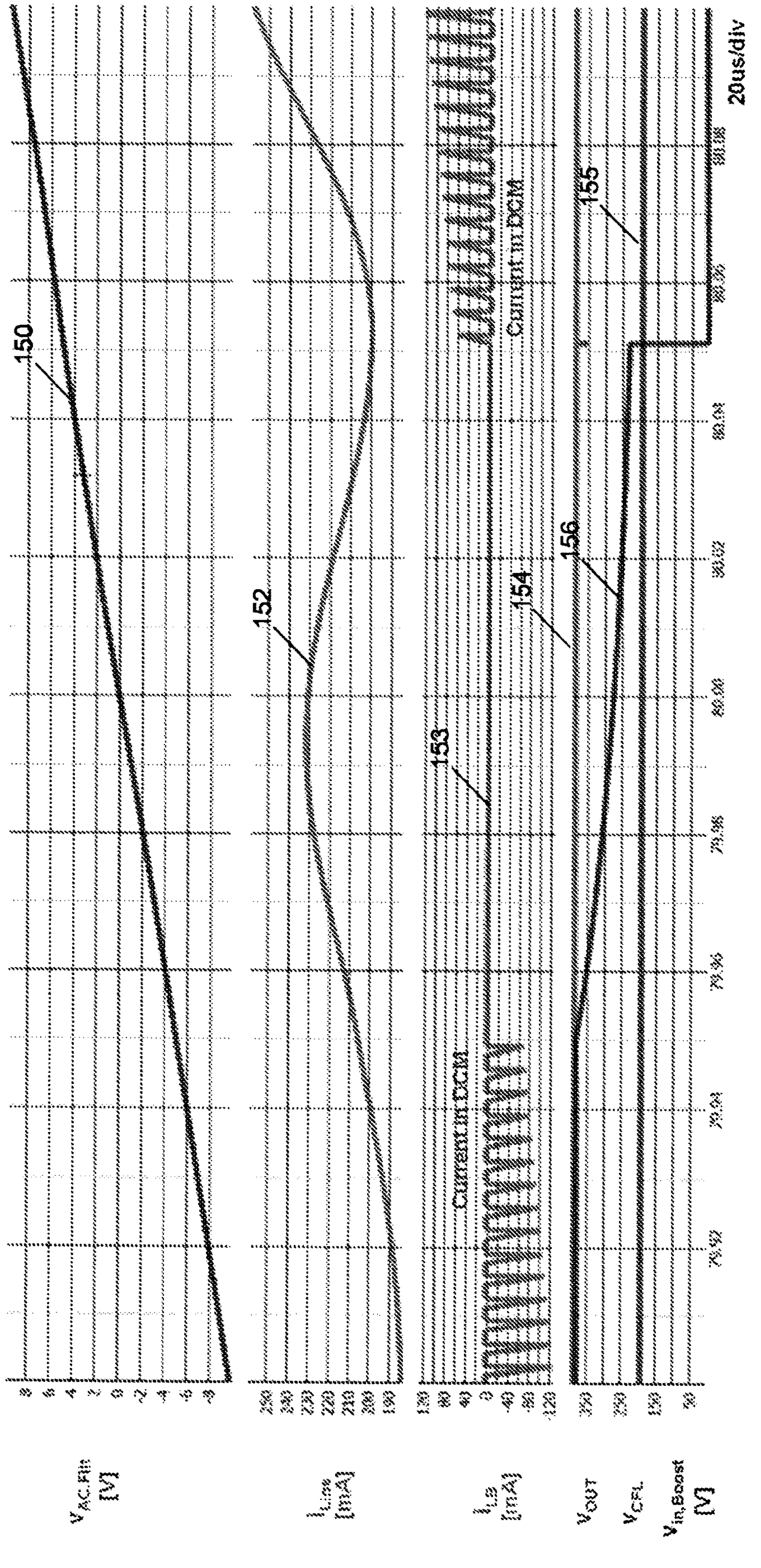
FIG. 15B shows the important waveforms of FIG. 15A zoomed in around a zero-crossing of the line voltage.
Figure 16A:
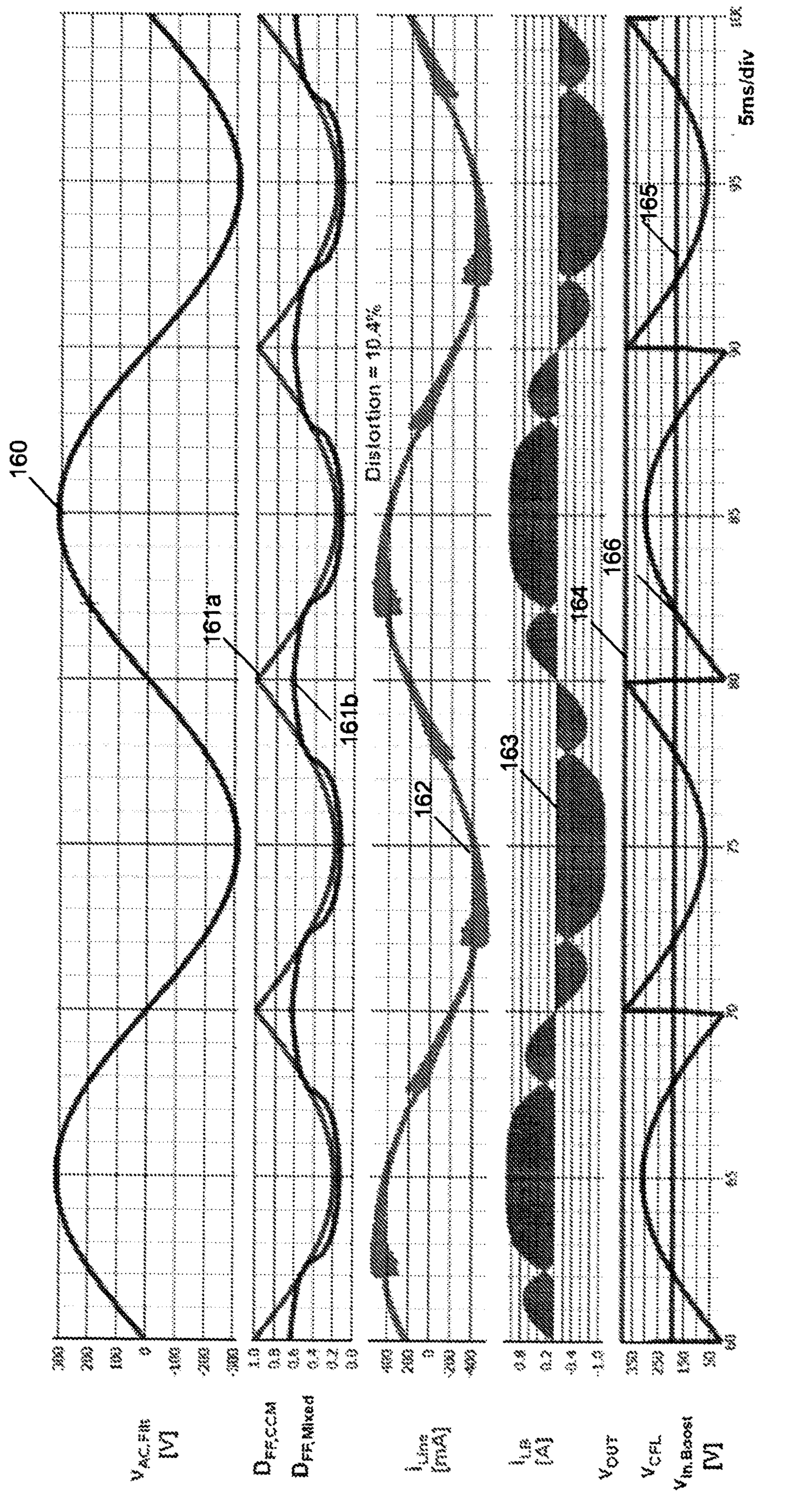
FIG. 16A shows important waveforms obtained on an example 3-level FCML bridgeless totem-pole boost PFC converter at 2.5% load.
Figure 16B:
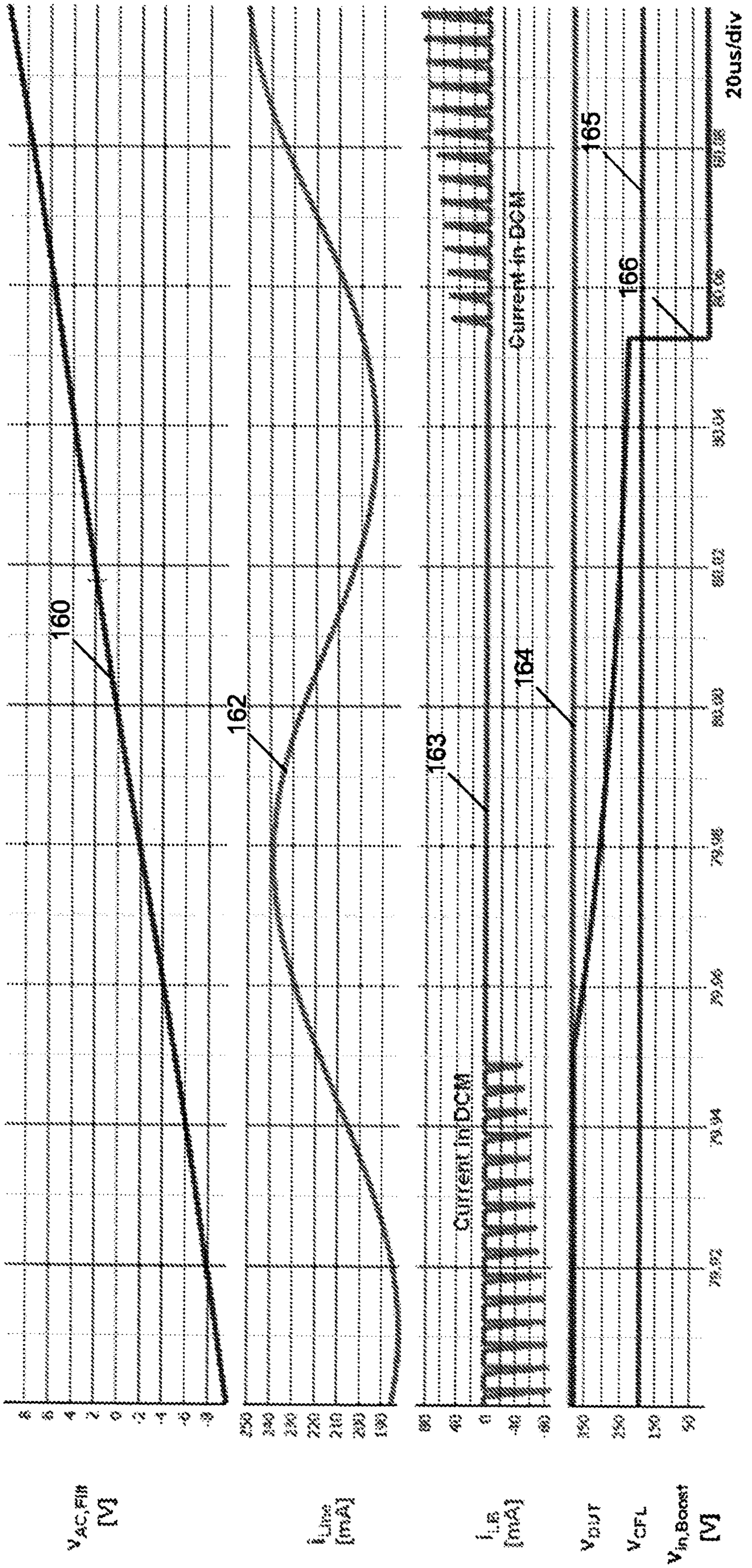
FIG. 16B shows the important waveforms of FIG. 16A zoomed in around a zero-crossing of the line voltage.
Figure 16C:
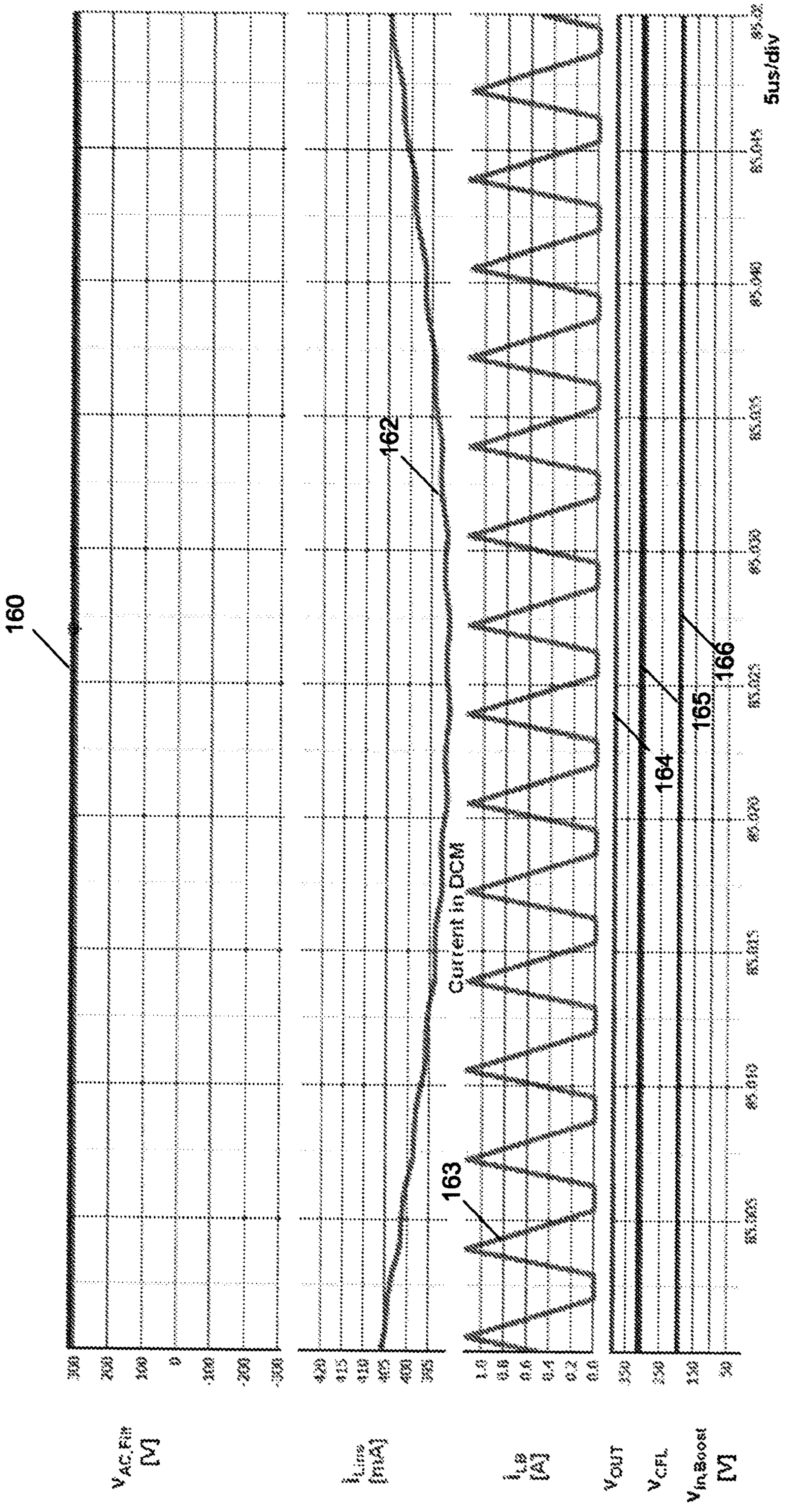
FIG. 16C shows the important waveforms of FIG. 16A zoomed in around a positive peak of the line voltage.

Important voltage and current waveforms that illustrate the MCM operation of a flying-capacitor, 3-level bridgeless totem-pole boost PFC are shown in FIGS. 14 (including 14A and 14B), 15 (including 15A and 15B), and 16 (including 16A, 16B, and 16C), respectively for operation at 10%, 5%, and 2.5% load. The waveforms in FIG. 14A from top to bottom are the waveforms of the line voltage after the EMI filter 140, the CCM feedforward duty cycle 141*a*, the MCM feedforward duty cycle 141*b*, the line current 142, boost inductor current 143, output voltage 144, flying capacitor voltage 145, and boost input voltage 146 obtained on a 2.5 KW boost PFC converter at 220-Vrms/50-Hz line voltage, 385-V output voltage. The waveforms in FIG. 15A from top to bottom are the waveforms of the line voltage after the EMI filter 150, the CCM feedforward duty cycle 151*a*, the MCM feedforward duty cycle 151*b*, the line current 152, boost inductor current 153, output voltage 154, flying capacitor voltage 155, and boost input voltage 156 obtained on a 2.5 KW boost PFC converter at 220-Vrms/50-Hz line voltage, 385-V output voltage. The waveforms in FIG. 16A from top to bottom are the waveforms of the line voltage after the EMI filter 160, the CCM feedforward duty cycle 161*a*, the MCM feedforward duty cycle 161*b*, the line current 162, boost inductor current 163, output voltage 164, flying capacitor voltage 165, and boost input voltage 166 obtained on a 2.5 kW boost PFC converter at 220-Vrms/50-Hz line voltage, 385-V output voltage. As shown in FIG. 14A, the distortion of the line current waveform 142 around the zero-crossings of the line voltage at 10% load with MCM feedforward duty cycle control is significantly reduced compared to that with only CCM feedforward duty cycle control. Note that the distortion percentage corresponds to total harmonic distortion (THD), which is understood in the industry to represent the proportion of harmonic current relative to the fundamental current. The increasing values for distortion from FIG. 14A (1.7%) to FIG. 15A (5.5%) to FIG. 16A (10.4%) reflects the decreased fundamental current values. In FIGS. 14B, 15B, and 16B, the waveforms of FIGS. 14A, 15A, and 16A, respectively, are zoomed in around a zero-crossing of the line voltage from the negative to positive half-line cycle; whereas, in FIG. 16C, the corresponding waveforms are zoomed in around a positive peak value of the line voltage. In FIGS. 14B, 15B, and 16B, the operation of the boost inductor in DCM around the zero-crossings of the line voltage is clearly shown, which is in correspondence with the feedforward duty cycles in FIG. 13. In FIG. 16C, the operation of the boost inductor in DCM around the positive peak of the line voltage is also clearly shown, which is in correspondence with the feedforward duty cycles in FIG. 13(*c*).

Figure 4:
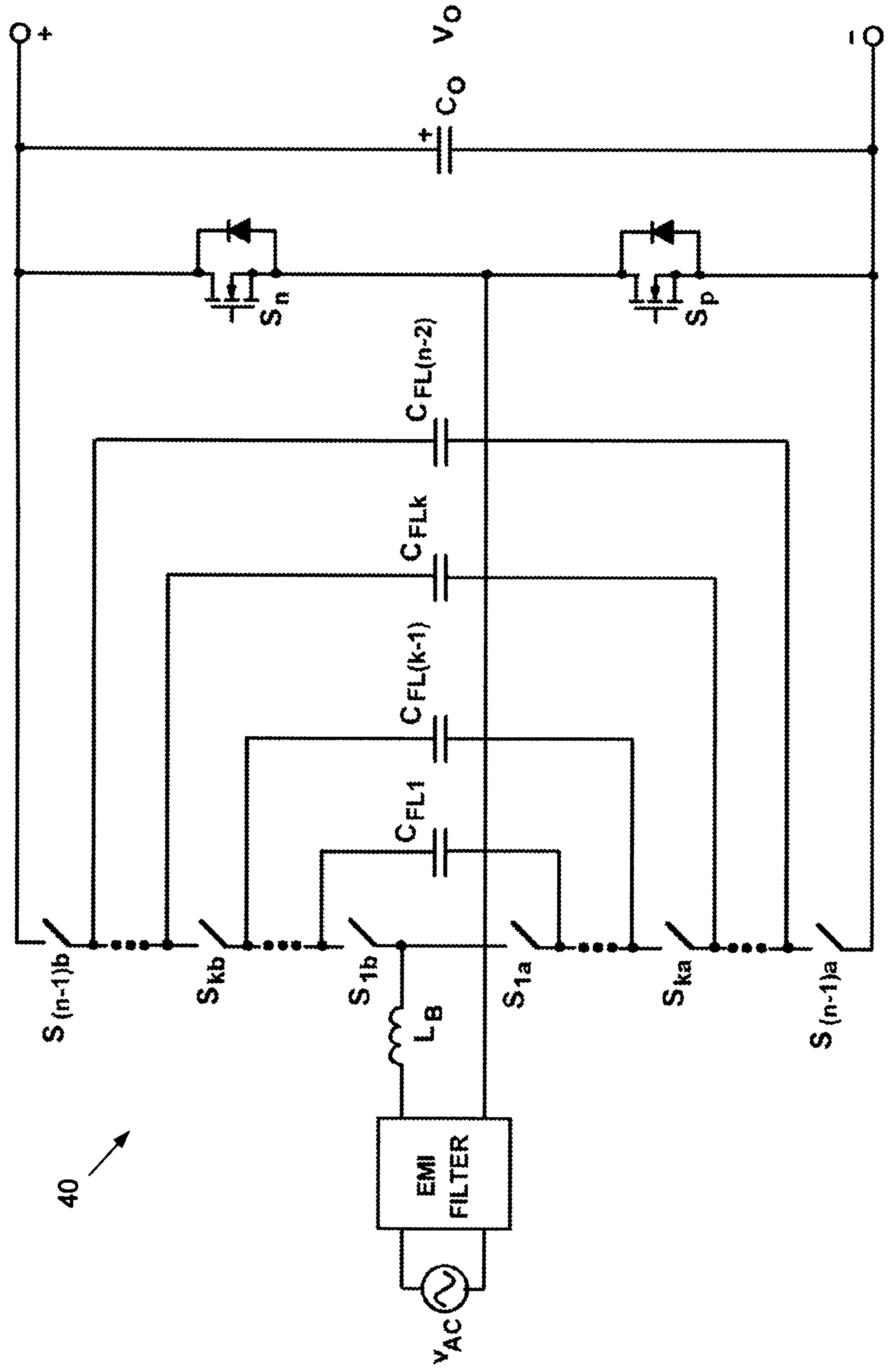
FIG. 4 shows a circuit diagram of an n-level FCML bridgeless totem-pole boost PFC converter.

The reduction of the zero-crossing distortion of the line current described above on the example of a 3-level FCML bridgeless totem-pole boost PFC converter, according to the present invention, can be generalized for an n-level FCML bridgeless totem-pole boost PFC converter shown in FIG. 4.

The control circuit 54 may be implemented using hardware, software (including firmware), or a combination of hardware and software. For instance, the control circuit 54 may be implemented using a digital signal processor (DSP), micro-controller, including the use of the following technologies existing in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The control circuit 54 may further include one or more pulsed generators.

Figure 17:
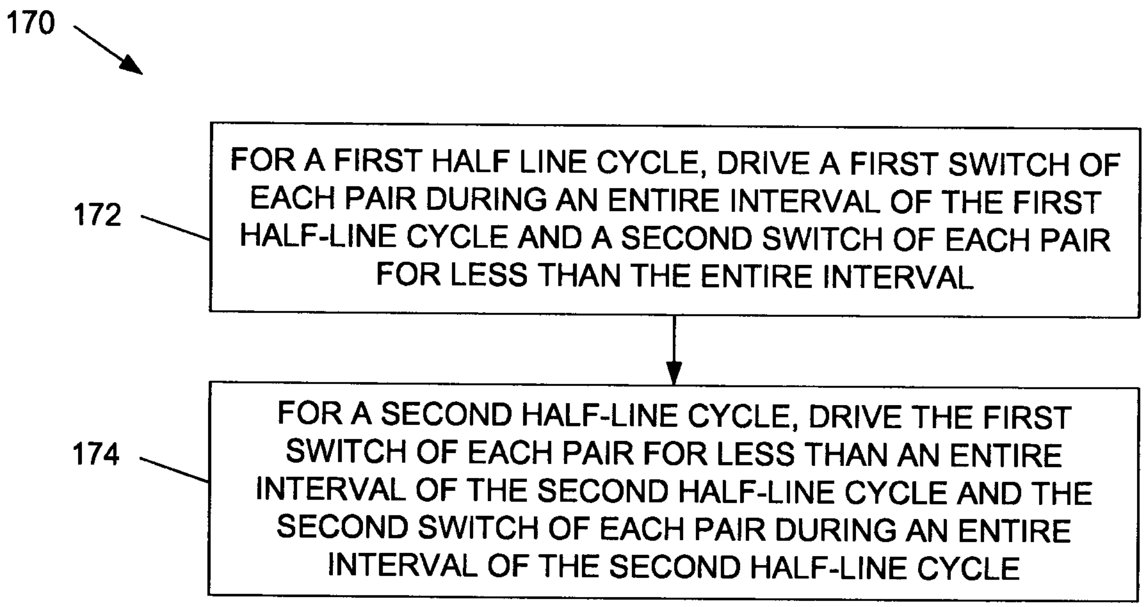
FIG. 17 shows a flow diagram of an example control method for a 3-level FCML bridgeless totem-pole boost PFC converter, in accordance with one embodiment.

Having described certain embodiments for 3-level FCML bridgeless totem-pole boost PFC converters, it should be appreciated within the context of the present disclosure that one embodiment of a control method, denoted control method 170 in FIG. 17, is disclosed. The control method 170 may be used for a multi-level, bridgeless boost power factor correction (PFC) device, the device comprising a circuit comprising an inductor, and at least a first pair and a second pair of switches and a capacitor arranged in a flying capacitor, totem-pole configuration. The control method 170 may be implemented by a control circuit configured to drive the at least first and second pairs of switches in such a way as to reduce distortion in a line current. In one embodiment, the control method 170 comprises, for a first half line cycle, driving a first switch of each pair during an entire interval of the first half-line cycle and a second switch of each pair for less than the entire interval (172). The control method 170 further comprises, for a second half-line cycle, driving the first switch of each pair for less than an entire interval of the second half-line cycle and the second switch of each pair during an entire interval of the second half-line cycle (174).

Figure 18:
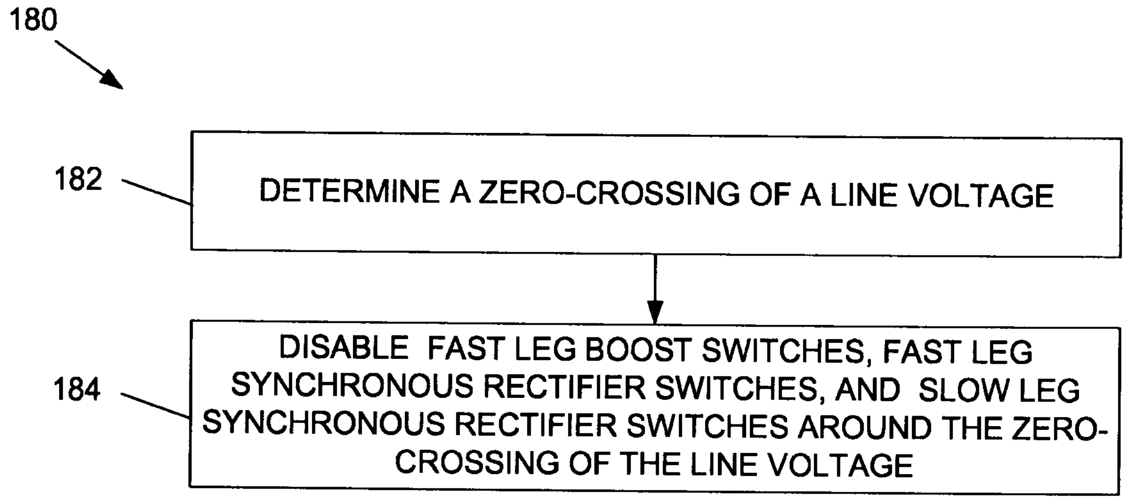
FIG. 18 shows a flow diagram of an example control method for a 3-level FCML bridgeless totem-pole boost PFC converter, in accordance with another embodiment.

In view of the above-described embodiments, it should be appreciated within the context of the present disclosure that another embodiment of a control method, denoted control method 180 in FIG. 18, is disclosed. The control method 180 may be used for a multi-level, bridgeless boost power factor correction (PFC) device, the device comprising a circuit comprising an inductor, and at least a first pair and a second pair of switches and a capacitor arranged in a flying capacitor, totem-pole configuration, and slow leg synchronous rectifier switches, the first pair and second pairs each comprising a fast leg boost switch and a fast leg synchronous rectifier switch. The control method 180, which may be implemented by a control circuit, comprises determining a zero-crossing of a line voltage (182). The control method 180 further comprises disabling the fast leg boost switches, the fast leg synchronous rectifier switches, and the slow leg synchronous rectifier switches around the zero-crossing of the line voltage (184).

Figure 19:
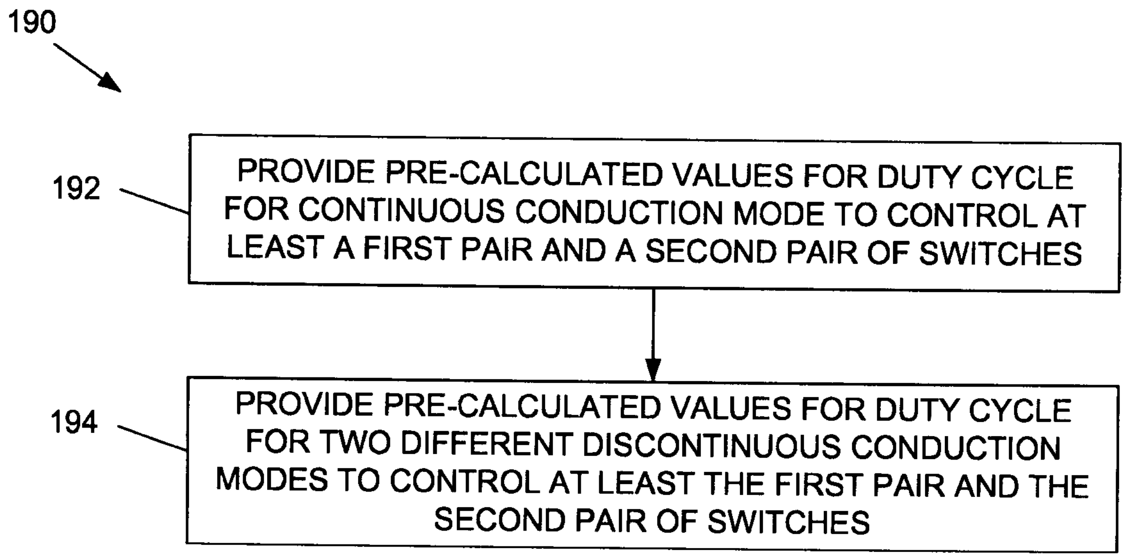
FIG. 19 shows a flow diagram of an example control method for a 3-level FCML bridgeless totem-pole boost PFC converter, in accordance with yet another embodiment.

In view of the above-described embodiments, it should be appreciated within the context of the present disclosure that yet another embodiment of a control method, denoted control method 190 in FIG. 19, is disclosed. The control method 190 may be used for a multi-level, bridgeless boost power factor correction (PFC) device, the device comprising a circuit comprising an inductor, and at least a first pair and a second pair of switches and a capacitor arranged in a flying capacitor, totem-pole configuration. The control method 180, which may be implemented by a control circuit comprising a feedforward control component, comprises providing pre-calculated values for duty cycle for continuous conduction mode to control the at least first pair and the second pair of switches (192). The method 190 further comprises providing pre-calculated values for duty cycle for two different discontinuous conduction modes to control the at least first pair and the second pair of switches (194).

Having described certain embodiments of a multi-level, bridgeless boost PFC device and associated methods, and with reference to at least FIGS. 5, 8A, and 17, it should be appreciated that one example first embodiment of a multi-level, bridgeless boost PFC device 50 (hereinafter, for the description of the first embodiment, simply referred to as device) includes a circuit 52 including an inductor 51, and at least a first pair 53 and a second pair 55 of switches and a capacitor 59 arranged in a flying capacitor, totem-pole configuration; and a control circuit 54 configured to drive the at least first and second pairs of switches in such a way as to reduce distortion in a line current, wherein for the first and second pairs of switches, the control circuit is configured to: for a first half line cycle, drive a first switch (53*a*, 55*a*) of each pair during an entire interval of the first half-line cycle and a second switch (53*b*, 55*b*) of each pair for less than the entire interval (172); and for a second half-line cycle, drive the first switch of each pair for less than an entire interval of the second half-line cycle and the second switch of each pair during an entire interval of the second half-line cycle (174).

The example first embodiment may include any one or combination of the following features.

For the device of the example first embodiment, for the first half-line cycle, the first switch of each pair operates as a boost switch and the second switch of each pair operates as a synchronous rectifier switch, wherein the control circuit is configured to drive the boost switches using gate-drive pulses ($V_{GS1a}$, $V_{GS1b}$) and disable the synchronous rectifier switches during an interval (88*a*, 88*b*) at least proximal to a zero-crossing of the line voltage.

For the device of the example first embodiment, for the first half-line cycle, the synchronous rectifier switches are disabled based on the control circuit blanking the gate-drive pulses to the synchronous rectifier switches on each side of zero-crossings of the line voltage.

For the device of the example first embodiment, for the first half-line cycle, the synchronous rectifier switches are disabled based on the control circuit blanking the gate-drive pulses to the synchronous rectifier switches during the entire first half-line cycle.

For the device of the example first embodiment, for the second half-line cycle, the second switch of each pair operates as a boost switch and the first switch of each pair operates as a synchronous rectifier switch, wherein the control circuit is configured to drive the boost switches using gate-drive pulses and disable the synchronous rectifier switches during an interval at least proximal to a zero-crossings of the line voltage.

For the device of the example first embodiment, for the second half-line cycle, the synchronous rectifier switches are disabled based on the control circuit blanking the gate-drive pulses to the synchronous rectifier switches on each side of zero-crossings of the line voltage.

For the device of the example first embodiment, for the second half-line cycle, the synchronous rectifier switches are disabled based on the control circuit blanking the gate-drive pulses to the synchronous rectifier switches during the entire second half-line cycle.

For the device of the example first embodiment, the first and second pair of switches consist of fast leg switches, further comprising a pair of slow leg SR switches (57*a*, 57*b*).

With reference to at least FIGS. 9A-10 and 18, it should be appreciated that one example second embodiment of a multi-level, bridgeless boost PFC device 50 (hereinafter, for the description of the second embodiment, simply device 50) includes a circuit 52 including an inductor 51, and at least a first pair 53 and a second pair 55 of switches and a capacitor 59 arranged in a flying capacitor, totem-pole configuration, and slow leg synchronous rectifier switches 57, the first pair and second pairs each comprising a fast leg boost switch and a fast leg synchronous rectifier switch; and a control circuit 54 configured to disable the fast leg boost switches, the fast leg synchronous rectifier switches, and the slow leg synchronous rectifier switches around a zero-crossing of a line voltage (184).

The example second embodiment may include any one or combination of the following features.

For the device of the example second embodiment, the control circuit is configured to disable the fast leg boost switches, the fast leg synchronous rectifier switches, and the slow leg synchronous rectifier switches by blanking corresponding gate-drive pulses during intervals on each side of the zero-crossing.

For the device of the example second embodiment, the intervals of the blanking are the same for the fast leg boost switches, the fast leg synchronous rectifier switches, and the slow leg synchronous rectifier switches.

For the device of the example second embodiment, the intervals (101) of the blanking are different among the fast leg boost switches, the fast leg synchronous rectifier switches, and the slow leg synchronous rectifier switches.

For the device of the example second embodiment, the intervals of the blanking before a zero-crossing point of a line voltage are different from the intervals of the blanking after the zero-crossing point.

For the device of the example second embodiment, the control circuit is configured to provide a first blanking interval (101*e*, 101*f*) for the fast leg boost switches, a second blanking interval (101*c*, 101*d*) for the fast leg synchronous rectifier switches, and a third blanking interval (101*a*, 101*b*) for the slow leg synchronous rectifier switches, wherein the first, second, and third blanking intervals are different.

For the device of the example second embodiment, the control circuit is further configured to provide boost soft start (98) pulses using open loop control (56A) while disabling gate-drive pulses that are based on closed loop control, the boost soft start pulses provided at the end of a blanking interval for the fast leg boost switches.

For the device of the example second embodiment, upon the end of providing the boost soft start pulses, the control circuit is further configured to activate (101*b*) one of the slow leg synchronous rectifier switches followed, after a delay, by the activation (101*c*, 101*d*) of fast leg synchronous rectifier switches.

With reference to at least FIGS. 12-13 and 19, it should be appreciated that one example third embodiment of a multi-level, bridgeless boost PFC device 50 (hereinafter, for the description of the third embodiment, simply device 50) includes a circuit 52 including an inductor 51, and at least a first pair 53 and a second pair 55 of switches and a capacitor 59 arranged in a flying capacitor, totem-pole configuration; and a control circuit 54 comprising a feedforward control component 1202 configured to provide pre-calculated values for duty cycle for continuous conduction mode (192) and two different discontinuous conduction modes to control the at least first pair and the second pair of switches (194).

The example third embodiment may include any one or combination of the following features.

For the device of the example third embodiment, the control circuit is configured to switch among the continuous conduction mode and the two different discontinuous conduction modes during an entire line voltage, half-line cycle between the zero-crossings of the line voltage.

For the device of the example third embodiment, the control circuit is configured to select either the continuous conduction mode or one of the two different discontinuous conduction modes based on a lowest value of the duty cycle.

For the device of the example third embodiment, the pre-calculated values for duty cycle for the two discontinuous conduction modes are based on two different calculations that are dependent on a comparison between an input voltage of the circuit and an output voltage of the circuit.

Note that the example first, second, and third embodiments may be combined in any combination in some embodiments.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A multi-level bridgeless boost power factor correction (PFC) device, comprising:
- an inductor configured to electrically connect to an AC source providing a line voltage;
- a first set of switches, comprising two or more switches arranged in series, configured to be electrically connected to a terminal of the inductor at one end and to a negative output terminal at an opposite end;
- a second set of switches, comprising two or more switches arranged in series, configured to be electrically connected to the terminal of the inductor at one end and to a positive output terminal at an opposite end, wherein an output voltage of the multi-level bridgeless boost PFC converter is between the positive output terminal and the negative output terminal;
- one or more flying capacitors, wherein each of the one or more flying capacitors is connected between different pairs of adjacent ones of the first set of switches and corresponding adjacent ones of the second set of switches; and
- a control circuit configured to:
  - for a positive half-line cycle, drive the first set of switches to operate as boost switches and drive the second set of switches to operate as synchronous rectifier switches; and
  - for a negative half-line cycle, drive the second set of switches to operate as boost switches and drive the first set of switches to operate as synchronous rectifier switches;
- wherein the control circuit is further configured to drive the first set of switches and the second set of switches in such a way as to reduce a line current distortion around zero-crossings of the line voltage;

wherein for every half-line cycle, the control circuit is configured to drive the boost switches for an entire half-line cycle and drive the synchronous rectifier switches for less than the entire half-line cycle.

2. The multi-level bridgeless boost PFC converter of claim 1, the control circuit is further configured to, for every half-line cycle, disable the synchronous rectifier switches for a first interval at a zero-crossing of the line voltage at the start of the half-line cycle and for a second interval at the zero-crossing of the line voltage at end of the half-line cycle.

3. The multi-level bridgeless boost PFC converter of claim 2, the control circuit is further configured to increase the first interval and the second interval as a load connected between the positive output terminal and the negative output terminal decreases.

4. The multi-level bridgeless boost PFC converter of claim 3, the control circuit is further configured to increase the first interval and the second interval to the entire half-line cycle when a load condition is lower than a preset percentage.

5. The multi-level bridgeless boost PFC converter of claim 1, wherein the control circuit is configured to operate the multi-level bridgeless boost PFC converter in a continuous conduction mode and multiple different discontinuous conduction modes.

6. A multi-level bridgeless boost power factor correction (PFC) device, comprising:

an inductor configured to electrically connect to an AC source providing a line voltage;

a first set of switches, comprising two or more switches arranged in series, configured to be electrically connected to a terminal of the inductor at one end and to a negative output terminal at an opposite end;

a second set of switches, comprising two or more switches arranged in series, configured to be electrically connected to the terminal of the inductor at one end and to a positive output terminal at an opposite end, wherein an output voltage of the multi-level bridgeless boost PFC converter is between the positive output terminal and the negative output terminal;

one or more flying capacitors, wherein each of the one or more flying capacitors is connected between different pairs of adjacent ones of the first set of switches and corresponding adjacent ones of the second set of switches;

a pair of slow leg synchronous rectifier switches connected in series, where a common terminal of the slow leg synchronous rectifier switches is connected to the AC source, a top terminal of an upper slow leg synchronous rectifier switch is connected to the positive output terminal and a bottom terminal of a bottom slow leg synchronous rectifier is connected to the negative output terminal; and a control circuit configured to:

for a positive half-line cycle, drive the first set of switches to operate as boost switches, drive the second set of switches to operate as synchronous rectifier switches, and enable the bottom slow leg synchronous rectifier switches and disable the upper slow leg synchronous rectifier switches; and for a negative half-line cycle, drive the second set of switches to operate as boost switches, drive the first set of switches to operate as synchronous rectifier switches, and enable the upper slow leg synchronous rectifier switches and disable the bottom slow leg synchronous rectifier switches;

wherein the control circuit is further configured to:

disable the boost switches, the synchronous rectifier switches and the slow leg synchronous rectifier switches before and after a zero-crossing of the line voltage as to reduce a line current distortion around zero-crossings of the line voltage.

7. The multi-level bridgeless boost PFC device of claim 6, wherein the control circuit is configured to disable the boost switches, the synchronous rectifier switches and the slow leg synchronous rectifier switches by blanking corresponding gate-drive pulses during intervals on each side of the zero-crossing of the line voltage.

8. The multi-level bridgeless boost PFC device of claim 7, wherein the intervals of the blanking are the same for the boost switches, the synchronous rectifier switches and the slow leg synchronous rectifier switches.

9. The multi-level bridgeless boost PFC device of claim 7, wherein the intervals of the blanking are different among the boost switches, the synchronous rectifier switches and the slow leg synchronous rectifier switches.

10. The multi-level bridgeless boost PFC device of claim 9, wherein the intervals of the blanking of the slow leg synchronous rectifier switches are smaller than those of the synchronous rectifier switches and are larger than those of the boost switches.

11. The multi-level bridgeless boost PFC device of claim 7, wherein the intervals of the blanking before a zero-crossing point of the line voltage are different from the intervals of the blanking after the zero-crossing point of the line voltage.

12. The multi-level bridgeless boost PFC device of claim 7, wherein the control circuit is further configured to provide soft start pulses for the boost switches using open loop control while disabling the corresponding gate-drive pulses that are based on closed loop control, and the soft start pulses for the boost switches are provided at end of the intervals of the blanking of the boost switches, wherein upon end of providing the soft start pulses for the boost switches, the control circuit is further configured to activate one of the slow leg synchronous rectifier switches, followed by activation of the synchronous rectifier switches after a delay time.

13. The multi-level bridgeless boost PFC device of claim 12, wherein the soft start pulses for different boost switches are of the same phase.

14. The multi-level bridgeless boost PFC device of claim 6, the control circuit further comprises a feedforward control component configured to provide pre-calculated values for duty cycle for continuous conduction mode and multiple different discontinuous conduction modes to control the first set of switches and the second set of switches.

15. The multi-level bridgeless boost PFC device of claim 14, wherein the control circuit is configured to switch among the continuous conduction mode and the multiple different discontinuous conduction modes during an entire half-line cycle between zero-crossings of the line voltage, and the control circuit is configured to select either the continuous conduction mode or one of the multiple discontinuous conduction modes based on a lowest value of the duty cycle.

16. The multi-level bridgeless boost PFC device of claim 14, wherein the pre-calculated values for the duty cycle for the multiple discontinuous conduction modes are based on multiple different calculations that are dependent on a comparison between the line voltage and the output voltage.

* * * * *